United States Patent
Agesen et al.

(10) Patent No.: US 6,529,919 B1
(45) Date of Patent: Mar. 4, 2003

(54) INCREMENTAL CLASS UNLOADING IN A TRAIN-ALGORITHM-BASED GARBAGE COLLECTOR

(75) Inventors: Ole Agesen, Needham, MA (US); Alexander T. Garthwaite, Beverly, MA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/504,091

(22) Filed: Feb. 15, 2000

(51) Int. Cl.$^7$ .............................................. G06F 12/00

(52) U.S. Cl. ..................... 707/206; 707/103 R; 707/205

(58) Field of Search .......................... 707/1, 4, 10, 100, 707/101, 103, 104.1, 200, 202–206, 15, 16, 20, 25; 711/100, 154, 165, 170, 171, 173; 706/15, 16, 20, 25

(56) References Cited

U.S. PATENT DOCUMENTS

| | | | |
|---|---|---|---|
| 4,912,629 A | | 3/1990 | Shuler, Jr. ................... 364/200 |
| 5,333,318 A | * | 7/1994 | Wolf ....................... 707/104.1 |
| 5,687,370 A | * | 11/1997 | Garst et al. ................. 707/206 |
| 5,801,943 A | * | 9/1998 | Nasburg ..................... 340/910 |
| 5,845,278 A | * | 12/1998 | Kirsch et al. .................. 707/1 |
| 5,845,298 A | | 12/1998 | O'Connor et al. .......... 707/206 |
| 5,900,001 A | | 5/1999 | Wolczko et al. ............ 707/206 |
| 5,903,900 A | | 5/1999 | Knippel et al. ............. 707/206 |
| 5,953,736 A | | 9/1999 | O'Connor et al. ............. 711/6 |
| 6,148,310 A | * | 11/2000 | Azagury et al. ............ 707/206 |
| 6,226,653 B1 | * | 5/2001 | Alpern et al. .................. 707/1 |
| 6,289,358 B1 | * | 9/2001 | Mattis et al. ................. 707/10 |

FOREIGN PATENT DOCUMENTS

EP 0940755 A1 9/1999

OTHER PUBLICATIONS

Bill Venners, Garbage Collection, Inside the Java 2 Virtual Machine, Chapter 9, parts 1–18, www.artima.com., May 23, 2000.

Paul R. Wilson, "Uniprocessor Garbage Collection Techniques", in Yves Bekkers and Jacques Cohen, editors, Proceedings of International Workshop on Memory Management, vol. 637 of Lecture Notes in Computer Science, 1992 Springer–Verlag.

Henry Lieberman and Carl Hewitt, "A Real–Time Garbage Collector Based on the Lifetimes of Objects", Communications of the ACM, 26(6), pp. 419–429, 1983.

David Ungar, "Generation Scavenging: A Non–Disruptive High Performance Storage Reclamation Algorithm", ACM SIGPLAN Notices 19(5): 157–167, Apr. 1984.

Andrew W. Appel, "Simple Generational Garbage Collection and Fast Allocation", Software Practice and Experience, 19(2): 171–183, 1989.

Richard Hudson and Amer Diwan, "Adaptive Garbage Collection for Modula–3 and Small Talk" in OOPSLA/ECOOP '90 Workshop on Garbage Collection in Object–Oriented Systems, Oct. 1990, edited by Eric Jul and Niels–Christian Juul.

(List continued on next page.)

Primary Examiner—John E. Breene
Assistant Examiner—Harold E. Dodds, Jr.
(74) Attorney, Agent, or Firm—Cesari and McKenna, LLP

(57) ABSTRACT

A garbage collector collects a train-managed heap in accordance with the train algorithm. In doing so, it concentrates into a respective train the heap-located objects that belong to garbage cycles even if those cycles additionally include certain types of objects that are outside the train-managed heap. It does so by using objects within the heap as proxies for those extra-heap objects, and it evacuates into a proxy object's train any collection-set objects referred to by the extra-heap objects for which the proxy object is a proxy. The objects in those garbage cycles containing the extra-heap objects can thereby be collected incrementally despite the extra-heap references to them.

73 Claims, 17 Drawing Sheets-

OTHER PUBLICATIONS

Richard L. Hudson, J. Eliot B. Moss, Amer Diwan and Christopher F. Weight, "A Language–Independent Garbage Collector Toolkit" Coins Technical Report, Sep. 1991.

Anthony L. Hosking, J. Eliot B. Moss and Darko Stefanovic, "A Comparative Performance Evaluation of Write Barrier Implementation", in OOPSLA '92 ACM Conference on Object–Oriented Systems, Languages, and Application, vol. 27(10) of ACM SIGPLAN Notices. Vancouver, BC, Oct. 1992, ACM Press.

Richard L. Hudson and J. Eliot B. Moss, "Incremental Collection of Mature Objects,", Proceedings of the International Workshop on Memory Management, 1992, Springer–Verlag.

Urs Hölzle, "A Fast Write Barrier for Generational Garbage Collectors" in OOPSLA/ECOOP '93 Workshop on Garbage Collection in Object Oriented Systems, Oct. 1993, edited by Moss, Wilson and Zorn.

Antony L. Hosking and Richard L. Hudson, "Remembered Sets can Also Play Cards" in OOPSLA/ECOOP '93 Workshop on Garbage Collection in Object–Oriented Systems, Oct. 1993, edited by Moss, Wilson and Zorn.

Jacob Seligmann and Steffen Grarup, "Incremental Mature Garbage Collection Using Train Algorithm", in the European Conference on Object–Oriented Programming 1995 Proceedings. Available at http://www.daimi.aau.dk/jacobse/Papers/.

Steffen Grarup and Jacob Seligmann, "Incremental Mature Garbage Collection" M.Sc. Thesis, avaliable at http://www.daimi.aau.dk/jacobse/Papers/. Aug. 1993.

Azagury et al. "Combining Card Marking With Remembered Sets: How to Save Scanning Time", Proceedings of the First International Symposium on Memory Management, vol. 34(3) of ACM SIGPLAN Notices, Vancouver: ACM Press, Oct. 1998.

* cited by examiner

INCREMENTAL CLASS UNLOADING IN A TRAIN-ALGORITHM-BASED GARBAGE COLLECTOR

CROSS-REFERENCE TO RELATED APPLICATIONS

This application is related to U.S. patent application Ser. No. 09/377,349 of Alexander T. Garthwaite for Popular-Object Handling in a Train-Algorithm-Based Garbage Collector, U.S. patent application Ser. No. 09/377,473 of Alexander T. Garthwaite for Scalable-Remembered-Set Garbage Collection, U.S. patent application Ser. No. 09/377,137 of Garthwaite et al. for Reduced-Cost Remembered-Set Processing in a Train-Algorithm-Based Garbage Collector, U.S. patent application Ser. No. 09/377,555 of Alexander T. Garthwaite for Train-Algorithm-Based Garbage Collector Employing Fixed-Size Remembered Sets, U.S. patent application Ser. No. 09/377,289 of Alexander T. Garthwaite for Train-Algorithm-Based Garbage Collector Employing Reduced Oversize-Object Threshold, U.S. patent application Ser. No. 09/377,654 of Garthwaite et al. for a Train-Algorithm-Based Garbage Collector Employing Farthest-Forward-Car Indicator, all of which were filed on Aug. 19, 1999, are assigned to the instant application's assignee, and are hereby incorporated in their entirety by reference.

BACKGROUND OF THE INVENTION

1. Field of the Invention

The present invention is directed to memory management. It particularly concerns what has come to be known as "garbage collection."

2. Background Information

In the field of computer systems, considerable effort has been expended on the task of allocating memory to data objects. For the purposes of this discussion, the term object refers to a data structure represented in a computer system's memory. Other terms sometimes used for the same concept are record and structure. An object may be identified by a reference, a relatively small amount of information that can be used to access the object. A reference can be represented as a "pointer" or a "machine address," which may require, for instance, only sixteen, thirty-two, or sixty-four bits of information, although there are other ways to represent a reference.

In some systems, which are usually known as "object oriented," objects may have associated methods, which are routines that can be invoked by reference to the object. They also may belong to a class, which is an organizational entity that may contain method code or other information shared by all objects belonging to that class. In the discussion that follows, though, the term object will not be limited to such structures; it will additionally include structures with which methods and classes are not associated.

The invention to be described below is applicable to systems that allocate memory to objects dynamically. Not all systems employ dynamic allocation. In some computer languages, source programs can be so written that all objects to which the program's variables refer are bound to storage locations at compile time. This storage-allocation approach, sometimes referred to as "static allocation," is the policy traditionally used by the Fortran programming language, for example.

Even for compilers that are thought of as allocating objects only statically, of course, there is often a certain level of abstraction to this binding of objects to storage locations. Consider the typical computer system 10 depicted in FIG. 1, for example. Data, and instructions for operating on them, that a microprocessor 11 uses may reside in on-board cache memory or be received from further cache memory 12, possibly through the mediation of a cache controller 13. That controller 13 can in turn receive such data from system read/write memory ("RAM") 14 through a RAM controller 15 or from various peripheral devices through a system bus 16. The memory space made available to an application program may be "virtual" in the sense that it may actually be considerably larger than RAM 14 provides. So the RAM contents will be swapped to and from a system disk 17.

Additionally, the actual physical operations performed to access some of the most-recently visited parts of the process's address space often will actually be performed in the cache 12 or in a cache on board microprocessor 11 rather than on the RAM 14, with which those caches swap data and instructions just as RAM 14 and system disk 17 do with each other.

A further level of abstraction results from the fact that an application will often be run as one of many processes operating concurrently with the support of an underlying operating system. As part of that system's memory management, the application's memory space may be moved among different actual physical locations many times in order to allow different processes to employ shared physical memory devices. That is, the location specified in the application's machine code may actually result in different physical locations at different times because the operating system adds different offsets to the machine-language-specified location.

Despite these expedients, the use of static memory allocation in writing certain long-lived applications makes it difficult to restrict storage requirements to the available memory space. Abiding by space limitations is easier when the platform provides for dynamic memory allocation, i.e., when memory space to be allocated to a given object is determined only at run time.

Dynamic allocation has a number of advantages, among which is that the run-time system is able to adapt allocation to run-time conditions. For example, the programmer can specify that space should be allocated for a given object only in response to a particular run-time condition. The C-language library function malloc( ) is often used for this purpose. Conversely, the programmer can specify conditions under which memory previously allocated to a given object can be reclaimed for reuse. The C-language library function free( ) results in such memory reclamation.

Because dynamic allocation provides for memory reuse, it facilitates generation of large or long-lived applications, which over the course of their lifetimes may employ objects whose total memory requirements would greatly exceed the available memory resources if they were bound to memory locations statically.

Particularly for long-lived applications, though, allocation and reclamation of dynamic memory must be performed carefully. If the application fails to reclaim unused memory—or, worse, loses track of the address of a dynamically allocated segment of memory—its memory requirements will grow over time to exceed the system's available memory. This kind of error is known as a "memory leak."

Another kind of error occurs when an application reclaims memory for reuse even though it still maintains a reference to that memory. If the reclaimed memory is reallocated for a different purpose, the application may inadvertently manipulate the same memory in multiple inconsistent ways.

This kind of error is known as a "dangling reference," because an application should not retain a reference to a memory location once that location is reclaimed. Explicit dynamic-memory management by using interfaces like malloc( )/free( ) often leads to these problems.

A way of reducing the likelihood of such leaks and related errors is to provide memory-space reclamation in a more-automatic manner. Techniques used by systems that reclaim memory space automatically are commonly referred to as "garbage collection." Garbage collectors operate by reclaiming space that they no longer consider "reachable." Statically allocated objects represented by a program's global variables are normally considered reachable throughout a program's life. Such objects are not ordinarily stored in the garbage collector's managed memory space, but they may contain references to dynamically allocated objects that are, and such objects are considered reachable. Clearly, an object referred to in the processor's call stack is reachable, as is an object referred to by register contents. And an object referred to by any reachable object is also reachable.

The use of garbage collectors is advantageous because, whereas a programmer working on a particular sequence of code can perform his task creditably in most respects with only local knowledge of the application at any given time, memory allocation and reclamation require a global knowledge of the program. Specifically, a programmer dealing with a given sequence of code does tend to know whether some portion of memory is still in use for that sequence of code, but it is considerably more difficult for him to know what the rest of the application is doing with that memory. By tracing references from some conservative notion of a "root set," e.g., global variables, registers, and the call stack, automatic garbage collectors obtain global knowledge in a methodical way. By using a garbage collector, the programmer is relieved of the need to worry about the application's global state and can concentrate on local-state issues, which are more manageable. The result is applications that are more robust, having no dangling references and fewer memory leaks.

Garbage-collection mechanisms can be implemented by various parts and levels of a computing system. One approach is simply to provide them as part of a batch compiler's output. Consider FIG. 2's simple batch-compiler operation, for example. A computer system executes in accordance with compiler object code and therefore acts as a compiler 20. The compiler object code is typically stored on a medium such as FIG. 1's system disk 17 or some other machine-readable medium, and it is loaded into RAM 14 to configure the computer system to act as a compiler. In some cases, though, the compiler object code's persistent storage may instead be provided in a server system remote from the machine that performs the compiling. The electrical signals that carry the digital data by which the computer systems exchange that code are exemplary forms of carrier waves transporting the information.

The input to the compiler is the application source code, and the end product of the compiler process is application object code. This object code defines an application 21, which typically operates on input such as mouse clicks, etc., to generate a display or some other type of output. This object code implements the relationship that the programmer intends to specify by his application source code. In one approach to garbage collection, the compiler 20, without the programmer's explicit direction, additionally generates code that automatically reclaims unreachable memory space.

Even in this simple case, though, there is a sense in which the application does not itself provide the entire garbage collector. Specifically, the application will typically call upon the underlying operating system's memory-allocation functions. And the operating system may in turn take advantage of various hardware that lends itself particularly to use in garbage collection. So even a very simple system may disperse the garbage-collection mechanism over a number of computer-system layers.

To get some sense of the variety of system components that can be used to implement garbage collection, consider FIG. 3's example of a more complex way in which various levels of source code can result in the machine instructions that a processor executes. In the FIG. 3 arrangement, the human applications programmer produces source code 22 written in a high-level language. A compiler 23 typically converts that code into "class files." These files include routines written in instructions, called "byte codes" 24, for a "virtual machine" that various processors can be configured to emulate. This conversion into byte codes is almost always separated in time from those codes' execution, so FIG. 3 divides the sequence into a "compile-time environment" 25 separate from a "run-time environment" 26, in which execution occurs. One example of a high-level-language environment for which compilers are available to produce such virtual-machine instructions is the Java™ platform. (Java is a trademark or registered trademark of Sun Microsystems, Inc., in the Unites States and other countries.)

Most typically, the class files' byte-code routines are executed by a processor under control of a virtual-machine process 27. That process emulates a virtual machine from whose instruction set the byte codes are drawn. As is true of the compiler 23, the virtual-machine process 27 may be specified by code stored on a local disk or some other machine-readable medium from which it is read into FIG. 1's RAM 14 to configure the computer system to act as a virtual machine and implement the garbage collector. Again, though, that code's persistent storage may instead be provided by a server system remote from the processor that implements the virtual machine, in which case the code would be transmitted electrically or optically to the virtual-machine-implementing processor.

In most implementations, much of the virtual machine's action in executing these byte codes is most like what those skilled in the art refer to as "interpreting," and FIG. 3 shows that the virtual machine includes an "interpreter" 28 for that purpose. The resultant instructions typically invoke calls to a run-time system 29, which handles matters such as loading new class files as they are needed and, of particular interest in the present connection, performing garbage collection.

In addition to running an interpreter, many virtual-machine implementations also actually compile the byte codes concurrently with the resultant object code's execution, so FIG. 3 depicts the virtual machine as additionally including a "just-in-time" compiler 30.

The arrangement of FIG. 3 differs from FIG. 2 in that the compiler 23 for converting the human programmer's code does not contribute to providing the garbage-collection function; that results largely from the virtual machine 27's operation. Although the FIG. 3 arrangement is a popular one, it is by no means universal, and many further implementation types can be expected. Proposals have even been made to implement the virtual machine 27's behavior in a hardware processor, in which case the hardware itself would provide some or all of the garbage-collection function.

In short, garbage collectors can be implemented in a wide range of combinations of hardware and/or software. As is true of most of the garbage-collection techniques described in the literature, the invention to be described below is applicable to most such systems.

By implementing garbage collection, a computer system can greatly reduce the occurrence of memory leaks and other software deficiencies in which human programming frequently results. But it can also have significant adverse performance effects if it is not implemented carefully. To distinguish the part of the program that does "useful" work from that which does the garbage collection, the term mutator is sometimes used in discussions of these effects; from the collector's point of view, what the mutator does is mutate active data structures' connectivity.

Some garbage-collection approaches rely heavily on interleaving garbage-collection steps among mutator steps. In one type of garbage-collection approach, for instance, the mutator operation of writing a reference is followed immediately by garbage-collector steps used to maintain a reference count in that object's header, and code for subsequent new-object storage includes steps for finding space occupied by objects whose reference count has fallen to zero. Obviously, such an approach can slow mutator operation significantly.

Other approaches therefore interleave very few garbage-collector-related instructions into the main mutator process but instead interrupt it from time to time to perform garbage-collection cycles, in which the garbage collector finds unreachable objects and reclaims their memory space for reuse. Such an approach will be assumed in discussing FIG. 4's depiction of a simple garbage-collection operation. Within the memory space allocated to a given application is a part 40 managed by automatic garbage collection. In the following discussion, this will be referred to as the "heap," although in other contexts that term refers to all dynamically allocated memory. During the course of the application's execution, space is allocated for various objects 42, 44, 46, 48, and 50. Typically, the mutator allocates space within the heap by invoking the garbage collector, which at some level manages access to the heap. Basically, the mutator asks the garbage collector for a pointer to a heap region where it can safely place the object's data. The garbage collector keeps track of the fact that the thus-allocated region is occupied. It will refrain from allocating that region in response to any other request until it determines that the mutator no longer needs the region allocated to that object.

Garbage collectors vary as to which objects they consider reachable and unreachable. For the present discussion, though, an object will be considered "reachable" if it is referred to, as object 42 is, by a reference in the root set 52. The root set consists of reference values stored in the mutator's threads' call stacks, the CPU registers, and global variables outside the garbage-collected heap. An object is also reachable if it is referred to, as object 46 is, by another reachable object (in this case, object 42). Objects that are not reachable can no longer affect the program, so it is safe to re-allocate the memory spaces that they occupy.

A typical approach to garbage collection is therefore to identify all reachable objects and reclaim any previously allocated memory that the reachable objects do not occupy. A typical garbage collector may identify reachable objects by tracing references from the root set 52. For the sake of simplicity, FIG. 4 depicts only one reference from the root set 52 into the heap 40. (Those skilled in the art will recognize that there are many ways to identify references, or at least data contents that may be references.) The collector notes that the root set points to object 42, which is therefore reachable, and that reachable object 42 points to object 46, which therefore is also reachable. But those reachable objects point to no other objects, so objects 44, 48, and 50 are all unreachable, and their memory space may be reclaimed.

To avoid excessive heap fragmentation, some garbage collectors additionally relocate reachable objects. FIG. 5 shows a typical approach. The heap is partitioned into two halves, hereafter called "semi-spaces." For one garbage-collection cycle, all objects are allocated in one semi-space 54, leaving the other semi-space 56 free. When the garbage-collection cycle occurs, objects identified as reachable are "evacuated" to the other semi-space 56, so all of semi-space 54 is then considered free. Once the garbage-collection cycle has occurred, all new objects are allocated in the lower semi-space 56 until yet another garbage-collection cycle occurs, at which time the reachable objects are evacuated back to the upper semi-space 54.

Although this relocation requires the extra steps of copying the reachable objects and updating references to them, it tends to be quite efficient, since most new objects quickly become unreachable, so most of the current semi-space is actually garbage. That is, only a relatively few, reachable objects need to be relocated, after which the entire semi-space contains only garbage and can be pronounced free for reallocation.

In one sense, the approach of interrupting the mutator occasionally for garbage collection can increase an application's responsiveness, because the main mutator operation ordinarily proceeds relatively unburdened by garbage-collection overhead. In interactive systems, moreover, interruptions for garbage collection can sometimes be scheduled opportunistically so as to reduce the like-lihood that they will result in much overall speed reduction. Garbage-collection an be triggered when the system is waiting for user input, for instance.

So it may often be true that the garbage-collection operation's effect on performance can depend less on the total collection time than on when collections actually occur. But another factor that often is even more determinative is the duration of any single collection cycle, i.e., how long the mutator must remain quiescent at any one time. In an interactive system, for instance, a user may never notice hundred-millisecond interruptions for garbage collection, whereas most users would find interruptions lasting for two seconds to be annoying. Many garbage collectors therefore operate incrementally. That is, they perform less than a complete collection in any single interruption of the main application.

A way of not only reducing collection-cycle length but also increasing overall efficiency is to segregate the heap into one or more parts, called generations, that are subject to different collection policies. New objects are allocated in a "young" generation, and older objects are promoted from younger generations to older or more "mature" generations. Collecting the younger generations more frequently than the others yields greater efficiency because the younger generations tend to accumulate garbage faster; newly allocated objects tend to "die," while older objects tend to "survive."

But generational collection greatly increases what is effectively the root set for a given generation. Consider FIG. 6, which depicts a heap as organized into three generations 58, 60, and 62. Assume that generation 60 is to be collected. The process for this individual generation may be more or less the same as that described in connection with FIGS. 4 and 5 for the entire heap, with one major exception. In the case of a single generation, the root set must be considered to include not only the call stack, registers, and global variables represented by set 52 but also objects in the other generations 58 and 62, which themselves may contain references to objects in generation 60. So pointers must be traced not only from the basic root set 52 but also from objects within the other generations.

One could perform this tracing by simply inspecting all references in all other generations at the beginning of every collection cycle, and it turns out that this approach is actually feasible in some situations. But it takes too long in other situations, so workers in this field have employed a number of approaches to expediting reference tracing. One approach is to include so-called write barriers in the mutator process. A write barrier is code added to a write operation to record information from which the collector can determine where references were or may have been written since the last collection cycle. A reference list can then be maintained by taking such a list as it existed at the end of the previous collection cycle and updating it by inspecting only locations identified by the write barrier as possibly modified since the last collection cycle.

One of the many such implementations commonly used by workers in this art employs what has been referred to as the "card table." FIG. 6 depicts the various generations as being divided into smaller sections, known for this purpose as "cards." Card tables 64, 66, and 68 associated with respective generations contain an entry for each of their cards. Each card-table entry includes some summary of its associated card's inter-generational-reference content. This summary may be no more than a binary indication of whether such a reference exists, but it preferably includes a list of offsets that indicate such references' locations in the card. Part of entry 69, for instance, may be an offset that indicates the location of an inter-generational reference 70 within the corresponding card 72. For the sake of concreteness, we will assume that the summaries are maintained by steps that occur principally at the beginning of each collection cycle.

Of course, the card-table approach is only one of many that can be employed to detect inter-generational pointers. Indeed, it is typical for an individual garbage collector to use more than one approach. Although there is no reason in principle to favor any particular number of generations, and although FIG. 6 shows three, most generational garbage collectors have only two generations, of which one is the young generation and the other is the mature generation. Moreover, although FIG. 6 shows the generations as being of the same size, a more-typical configuration is for the young generation to be considerably smaller. Finally, although we assumed for the sake of simplicity that collection during a given cycle was limited to only one generation, a more-typical approach is actually to collect the whole young generation at every cycle but to collect the mature one less frequently.

To collect the young generation, it is preferable to employ the card table to identify pointers into the young generation; laboriously scanning the entire mature generation would take too long. On the other hand, since the young generation is collected in every cycle and can therefore be collected before mature-generation processing, it takes little time to scan the few remaining, live objects in the young generation for pointers into the mature generation in order to process that generation. For this reason, the card table will typically be so maintained as only to identify the regions occupied by references into younger generations and not into older ones.

Now, although it typically takes very little time to collect the young generation, it may take more time than is acceptable within a single garbage-collection cycle to collect the entire mature generation. So some garbage collectors may collect the mature generation incrementally; that is, they may perform only a part of the mature generation's collection during any particular collection cycle. Incremental collection presents the problem that, since the generation's objects that are outside a collection cycle's collection set are not processed during that cycle, any such objects that are unreachable are not recognized as unreachable, so collection-set objects to which they refer tend not to be, either.

To reduce the adverse effect this would otherwise have on collection efficiency, workers in this field have employed the "train algorithm," which FIG. 7 depicts. A generation to be collected incrementally is divided into sections, which for reasons about to be described are referred to as "car sections." The generation may be collected incrementally in fixed-size sections, in which case the size may equal that of the generation portion to be collected during one cycle. More typically, the fraction of the generation to be collected during any one cycle varies with run-time conditions, in which case the car-section size is often that of the minimum fraction to be collected in one cycle, although that is not a requirement.

The discussion that follows will occasionally follow the nomenclature in the literature by using the term car instead of car section. But the literature seems to use that term to refer variously not only to memory sections themselves but also to data structures that the train algorithm employs to manage them when they contain objects, as well as to the more-abstract concept that the car section and managing data structure represent in discussions of the algorithm. So the following discussion will more frequently use the expression car section to emphasize the actual sections of memory space for whose management the car concept is employed.

Additionally, the car sections are grouped into "trains," which are ordered according to age. For example, FIG. 7 shows an oldest train 73 consisting of a generation 74's three car sections described by associated data structures 75, 76, and 78, while a second train 80 consists only of a single car section, represented by structure 82, and the youngest train 84 (referred to as the "allocation train") consists of car sections that data structures 86 and 88 represent. As will be seen below, car sections' train memberships can change, and any car section added to a train is added to the end of a train. Train size is a matter of design choice, but its purpose is to maximize the probability that garbage reference "cycles" can be reclaimed, as will now be explained.

Although more than one car section may be collected in any given cycle, little generality is lost by considering the situation in which only a single car is collected during any cycle. The car collected in any cycle is the one added least recently to the oldest train. In FIG. 7, that car would be car 75. All of the generation's cars can thus be thought of as waiting for collection in a single long line, in which cars in a given train are farther forward than those in any younger train, and those added to a train more recently are behind those added to it earlier.

As is usual, the way in which reachable objects are identified is to determine whether there are references to them in the root set or in any other object already determined to be reachable. In accordance with the train algorithm, the collector additionally performs a test to determine whether there are any references at all from outside the oldest train to objects within it. If there are none, then all cars within the train can be reclaimed, even though not all of those cars are in the collection set. And the train algorithm so operates that inter-car references tend to be grouped into trains, as will now be explained.

To identify references into the car from outside of it, train-algorithm implementations typically employ "remembered sets." As card tables are, remembered sets are used to keep track of references. Whereas a card-table entry contains information about references that the associated card contains, though, a remembered set associated with a given region contains information about references into that region from locations outside of it. In the case of the train algorithm, remembered sets are associated with car sections. Each remembered set, such as car 75's remembered set 90, lists locations in the generation that contain references into the associated car section. The remembered sets for all of a generation's cars are typically updated at the start of each collection cycle, concurrently with card-table updates. For reasons that will become apparent, the collector will typically not bother to place in the remembered set the locations of references from objects in car sections farther forward in the collection queue, i.e., from objects in older trains or cars added earlier to the same train. For the sake of simplicity, we will continue the assumption that only a single car is collected during each collection cycle, although we will discuss multiple-car collection sets presently.

When the remembered sets have been updated, the collector reads the remembered set of each car in the collection set to determine the location of each reference from a higher-order car into the collection set. The collector places the address of each reference thereby found into a scratch-pad list associated with the train that contains that reference. (Again, the remembered set lists only reference locations in the same generation.)

When the collector has read all references in the remembered set, it evacuates into the youngest train the collection-set-car objects referred to by the references in the locations that the youngest train's scratch-pad-list entries specify It also removes those scratch-pad-list entries and updates the references to which they pointed so that those references reflect the evacuated objects' new locations. Any collection-set objects to which the thus-evacuated objects refer are similarly evacuated to that train, and this continues until that train no longer contains any references into the collection-set car section.

Whenever an object is evacuated, the collector leaves an indication of this fact in the object's previous location, together with the address of its new location. So, if the reference found in the location identified by any subsequent scratch-pad-list entry refers to an already-evacuated object, the collector is apprised of this fact and can update the reference without attempting to evacuate the already-evacuated object.

This process is repeated for successively older trains until the collector reaches the oldest train. Before it processes references in that train's scratch-pad list,the collector evacuates any objects referred to from outside the generation To identify such objects, the collector scans the root set and other generations for references into the collection set. Now, it may not be necessary to scan all other generations. A particularly common scheme is not to collect any generation in a collection cycle in which every younger generation is not completely collected, and the policy may be to promote all surviving younger-generation objects into older generations. In such a situation, it is necessary only to scan older generations.

The scanning may actually involve inspecting each surviving object in the other generation, or the collector may expedite the process by using card-table entries. Regardless of which approach it uses, the collector immediately evacuates into another train any collection-set object to which it thereby finds an external reference. The typical policy is to place the evacuated object into the youngest such train. As before, the collector does not attempt to evacuate an object that has already been evacuated, and, when it does evacuate an object to a train, it evacuates to the same train any objects in the collection-set car to which the thus-evacuated object refers. In any case, the collector updates the reference to the evacuated object.

When all inter-generationally referred-to objects have been evacuated from the collection-set car the garbage collector then performs the train algorithm's central test: it determines whether there are any references into the oldest train from outside that train. If there are none other than those in the collection set, the entire train can be reclaimed, even if there are inter-car references between its individual cars. By evacuating objects into the trains that references to them occupy, the train algorithm tends to group garbage reference cycles into single trains, whose sizes are not limited, as car sizes are, by the need to optimize collection-cycle duration. The train algorithm is thus able to reclaim space occupied by large garbage reference cycles even if the space increments (car sections) that it collects are relatively small. To support this process, a tally of how many references there are from other trains in the same generation is typically maintained in connection with the various remembered-set updates. This tally, together with a tally of extra-generational references developed during the extra-generational scan, yields the indications of whether there are any references into a given train from outside that train.

If references into the oldest train have prevented its car sections from being reclaimed, the collector proceeds to evacuate any collection-set objects referred to by references whose locations the oldest train's scratch-pad list includes. It removes them to younger cars in the oldest train, again updating references, avoiding duplicate evacuations, and evacuating any collection-set-car objects to which the evacuated objects refer. When this process has been completed, the collection set can be reclaimed, since any reference to any remaining object must reside in the same car, so all remaining collection-set objects are unreachable.

FIGS. 8A–8J illustrate results of using the train algorithm. FIG. 8A represents a generation in which objects have been allocated in nine car sections. The oldest train has four cars, numbered 1.1 through 1.4. Car 1.1 has two objects, A and B. There is a reference to object B in the root set (which, as was explained above, includes live objects in the other generations). Object A is referred to by object L, which is in the third train's sole car section. In the generation's remembered sets 92, a reference in object L has therefore been recorded against car 1.1.

Processing always starts with the oldest train's earliest-added car, so the garbage collector refers to car 1.1's remembered set and finds that there is a reference from object L into the car being processed. It accordingly evacuates object A to the train that object L occupies. The object being evacuated is often placed in one of the selected train's existing cars, but we will assume for present purposes that there is not enough room. So the garbage collector evacuates object A into a new car section and updates appropriate data structures to identify it as the next car in the third train. FIG. 8B depicts the result: a new car has been added to the third train, and object A is placed in it.

FIG. 8B also shows that object B has been evacuated to a new car outside the first train. This is because object B has an external reference, which, like the reference to object A, is a reference from outside the first train, and one goal of the processing is to form trains into which there are no further references. Note that, to maintain a reference to the same object, object L's reference to object A has had to be rewritten, and so have object B's reference to object A and the inter-generational pointer to object B. In the illustrated example, the garbage collector begins a new train for the car into which object B is evacuated, but this is not a necessary requirement of the train algorithm. That algorithm requires only that externally referenced objects be evacuated to a newer train.

Since car 1.1 no longer contains live objects, it can be reclaimed, as FIG. 8B also indicates. Also note that the remembered set for car 2.1 now includes the address of a reference in object A, whereas it did not before. As was stated before, remembered sets in the illustrated embodiment include only references from cars further back in the order than the one with which the remembered set is associated. The reason for this is that any other cars will already be reclaimed by the time the car associated with that remembered set is processed, so there is no reason to keep track of references from them.

The next step is to process the next car, the one whose index is 1.2. The purpose of a generation's division into car sections is to provide for incremental collection, so collection of car 1.2 can wait until the collection cycle following the one during which car 1.1 is collected. Indeed, the garbage collector can postpone its processing for several collection cycles (during which presumably only younger generations are collected). As was mentioned above, we will assume in this scenario that each car's collection occurs in its own separate collection cycle. And for the sake of simplicity we will assume that the mutator does not change any references into the generation in the interim.

FIG. 8B depicts car 1.2 as containing only a single object, object C, and that car's remembered set contains the address of an inter-car reference from object F. The garbage collector follows that reference to object C. Since this identifies object C as possibly reachable, the garbage collector evacuates it from car set 1.2, which is to be reclaimed. Specifically, the garbage collector removes object C to a new car section, section 1.5, which is linked to the train to which the referring object F's car belongs. Of course, object F's reference needs to be updated to object C's new location. FIG. 8C depicts the evacuation's result.

FIG. 8C also indicates that car set 1.2 has been reclaimed, and car 1.3 is next to be processed. The only address in car 1.3's remembered set is that of a reference in object G. Inspection of that reference reveals that it refers to object F. Object F may therefore be reachable, so it must be evacuated before car section 1.3 is reclaimed. On the other hand, there are no references to objects D and E, so they are clearly garbage. FIG. 8D depicts the result of reclaiming car 1.3's space after evacuating possibly reachable object F.

In the state that FIG. 8D depicts, car 1.4 is next to be processed, and its remembered set contains the addresses of references in objects K and C. Inspection of object K's reference reveals that it refers to object H, so object H must be evacuated. Inspection of the other remembered-set entry, the reference in object C, reveals that it refers to object G, so that object is evacuated, too. As FIG. 8E illustrates, object H must be added to the second train, to which its referring object K belongs. In this case there is room enough in car 2.2, which its referring object K occupies, so evacuation of object H does not require that object K's reference to object H be added to car 2.2's remembered set. Object G is evacuated to a new car in the same train, since that train is where referring object C resides. And the address of the reference in object G to object C is added to car 1.5's remembered set.

FIG. 8E shows that this processing has eliminated all references into the first train, and it is an important part of the train algorithm to test for this condition. That is, even though there are references into both of the train's cars, those cars' contents can be recognized as all garbage because there are no references into the train from outside of it. So all of the first train's cars are reclaimed.

The collector accordingly processes car 2.1 during the next collection cycle, and that car's remembered set indicates that there are two references outside the car that refer to objects within it. Those references are in object K, which is in the same train, and object A, which is not. Inspection of those references reveals that they refer to objects I and J, which are evacuated.

The result, depicted in FIG. 8F, is that the remembered sets for the cars in the second train reveal no inter-car references, and there are no inter-generational references into it, either. That train's car sections therefore contain only garbage, and their memory space can be reclaimed.

So car 3.1 is processed next. Its sole object, object L, is referred to inter-generationally as well as by a reference in the fourth train's object M. As FIG. 8G shows, object L is therefore evacuated to the fourth train. And the address of the reference in object L to object A is placed in the remembered set associated with car 3.2, in which object A resides.

The next car to be processed is car 3.2, whose remembered set includes the addresses of references into it from objects B and L. Inspection of the reference from object B reveals that it refers to object A, which must therefore be evacuated to the fifth train before car 3.2 can be reclaimed. Also, we assume that object A cannot fit in car section 5.1, so a new car 5.2 is added to that train, as FIG. 8H shows, and object A is placed in its car section. All referred-to objects in the third train having been evacuated, that (single-car) train can be reclaimed in its entirety.

A further observation needs to be made before we leave FIG. 8G. Car 3.2's remembered set additionally lists a reference in object L, so the garbage collector inspects that reference and finds that it points to the location previously occupied by object A. This brings up a feature of copying-collection techniques such as the typical train-algorithm implementation. When the garbage collector evacuates an object from a car section, it marks the location as having been evacuated and leaves the address of the object's new location. So when the garbage collector traces the reference from object L, it finds that object A has been removed, and it accordingly copies the new location into object L as the new value of its reference to object A.

In the state that FIG. 8H illustrates, car 4.1 is the next to be processed. Inspection of the fourth train's remembered sets reveals no inter-train references into it, but the inter-generational scan (possibly performed with the aid of FIG. 6's card tables) reveals inter-generational references into car 4.2. So the fourth train cannot be reclaimed yet. The garbage collector accordingly evacuates car 4.1's referred-to objects in the normal manner, with the result that FIG. 8I depicts.

In that state, the next car to be processed has only inter-generational references into it. So, although its referred-to objects must therefore be evacuated from the train, they can be placed in any other train. In the illustrated implementation, a new train is formed for this purpose, so the result of car 4.2's processing is the state that FIG. 8J depicts.

Processing continues in this same fashion. Of course, subsequent collection cycles will not in general proceed, as in the illustrated cycles, without any reference changes by the mutator and without any addition of further objects. But reflection reveals that the general approach just described still applies when such mutations occur.

One shortcoming of the conventional approach to train-algorithm-based garbage collection is that certain types of objects will not end up being identified as unreachable unless measures are taken that compromise the train algorithm's incremental nature. To appreciate this, consider FIGS. 9A and 9B, which illustrate a typical approach to memory allocation for class information.

In an object-oriented program, a typical object 100 (FIG. 9B) contains a reference to information about the class to which it belongs. In a dynamically loaded system, such information is often loaded in units of "class files," of which the drawing gives an example 102 (FIG. 9A). The drawing depicts class file 102 as being stored outside of the train-algorithm-managed heap 104 (FIG. 9B). This is typical because the collection procedure uses the class file's information about object sizes, etc., and relocating the source of that information as part of the relocation process that depends on it would be complicated. But thus locating such class information outside the train-algorithm-managed heap tends to make it hard to collect some types of objects in an incremental fashion.

To appreciate this, it is helpful to consider a typical organization of class information. It turns out that the class file's organization may not be optimum for a given run-time system to use. So some of that information and/or information derived from it may be placed in a more-convenient form. To indicate this, the drawings show a "nearClass" structure 106. Its location may be used by object headers to identify the classes to which their objects belong, as the drawing indicates by pointer 107 in object 100's header. Because of such uses, the nearClass structure, too, is located outside of the heap 104.

But not all of the class-related information is located outside the heap 104. In the case of the Java programming language, for instance, it is a requirement that one be able to refer to a class as an object, so there must be an object structure to represent it. Compilers that target the Java virtual machine employ objects of the java.lang.Class class, which the drawing exemplifies in structure 108. Such objects, which we refer to herein as "proxy objects" because of a use to which our invention's below-illustrated embodiment puts them, should be located in the heap, as other objects are.

Now, the process of collecting structure 108 presents difficulties because of the types of references to it there tend to be. The class structure 102 itself will typically include a reference 110 to it. It will also be ultimately reachable from a "class loader." A class loader is a structure, exemplified in the drawings by structure 112, that contains information about how to load a class, such as where to look for its class file. For example, the virtual machine looking for "ourFirm.MyClass" may look in the local hard disk if the default loader is specified but instead look to a remote server if a different loader is specified.

The memory allocated to such a structure 112 cannot be reclaimed until the classes loaded in accordance with its contents are no longer reachable, so it contains a list of the classes it has been used to load. The illustrated embodiment implements this feature by a reference 114 to a vector structure 116. In the illustrated embodiment, this structure includes metadata about the vector, including a pointer 118 to structures such as structure 120 that contain the actual list of references to the classes that the loader has loaded. If the class represented by proxy object 108 has been loaded by the loader that structure 112 represents, then the list-containing structure 120 will include a reference 122 to the proxy object 108.

The problem that references of these types cause is that they can form cycles of references that the conventional train-algorithm implementation does not concentrate. As the diagram illustrates, an object such as object 100 of a given class refers to that class's nearClass structure 106, which refers to the class structure 102, which points to the proxy object 108. In the conventional train-algorithm approach, such external references tend to make the proxy object appear reachable, even though it may actually be part of an unreachable cycle, because the cycle runs through external space.

One can identify such cycles by periodically performing special, whole-heap (non-incremental) collection intervals. But this is unworkable for an application that cannot tolerate the delays that non-incremental collection often imposes. Alternatively, one can simply leave proxy objects uncollected. But this approach is unacceptable for applications that generate large numbers of classes.

SUMMARY OF THE INVENTION

We have devised a way of identifying such unreachable cycles, and reclaiming the associated memory resources, as part of the train algorithm's incremental collection process. Our approach involves associating various "proxy" objects in the train-managed heap with respective resources outside of it. If all external references to a collection-set object are located in resources associated with proxies in the heap, that object is, in essence, evacuated to the youngest train containing such a proxy, not the youngest train overall. So objects involved in cycles that include external objects can, like those involved in cycles entirely within the heap, be concentrated in single trains so that their resources are reclaimed by incremental collection. The external resources in the cycle can be reclaimed at the same time.

BRIEF DESCRIPTION OF THE DRAWINGS

The invention description below refers to the accompanying drawings, of which.

DETAILED DESCRIPTION OF AN ILLUSTRATIVE EMBODIMENT

Figure 10:
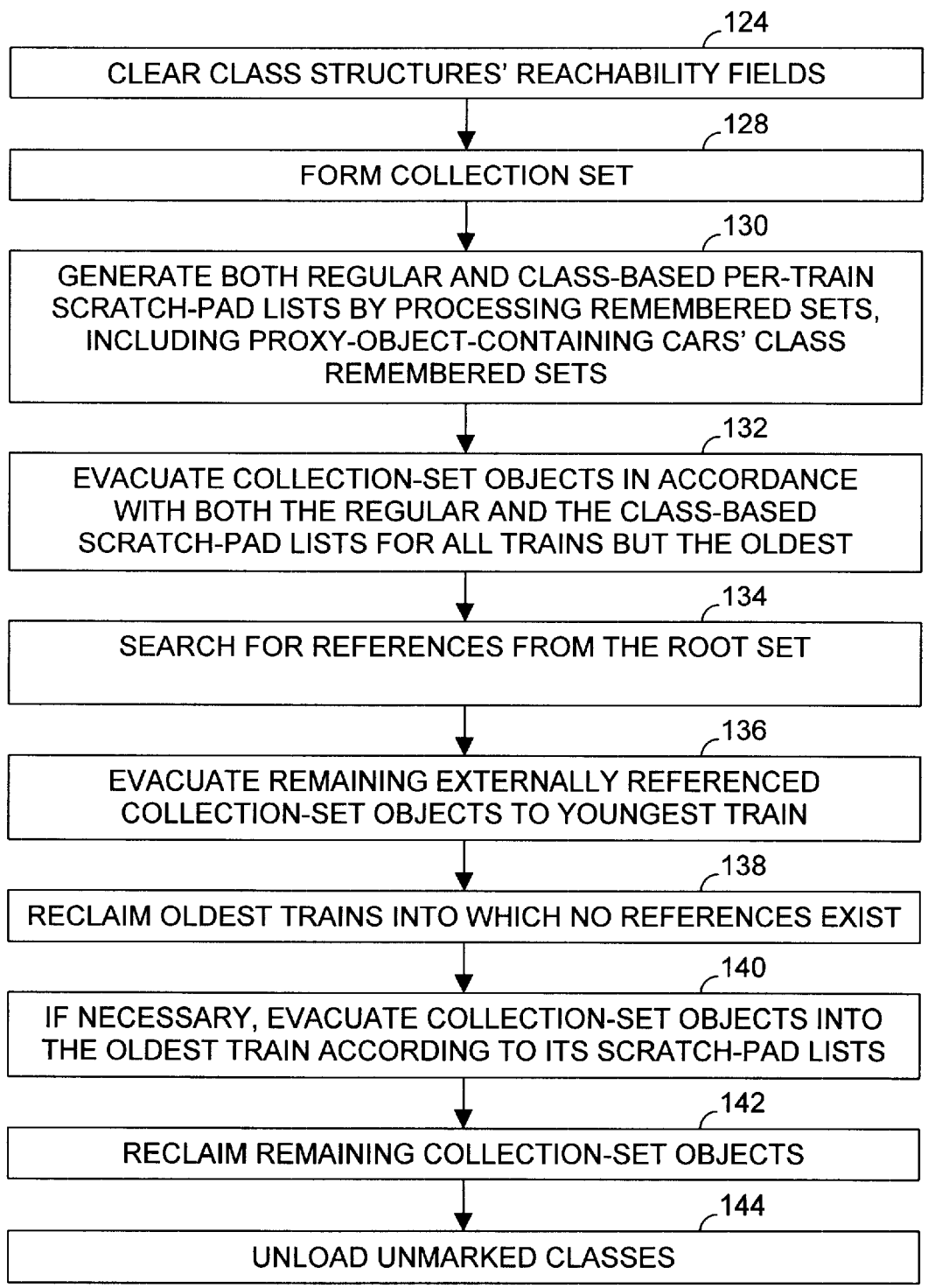
FIG. 10 is a flow chart that illustrates collection-interval operations of particular interest in connection with the present invention.

As was mentioned above, the present invention performs collection incrementally, but in a way that enables some garbage cycles having external references to be collected. FIG. 10 is a simplified representation of part of a collection interval consistent with the present invention. The patent applications incorporated by reference above describe in detail a number of features that various collectors employing the present invention's teachings may additionally employ. FIG. 10's blocks represent only certain steps selected to illustrate the present invention's salient features.

Near the beginning of a collection interval, the collector performs an operation that FIG. 10's block 124 represents. As will be explained below, steps will be performed during the collection interval to identify classes whose resources are still reachable, and the collector must keep track of the resulting determinations in some fashion. In the illustrated embodiment, the collector does so by appropriately marking a reachability field 126 (FIG. 9A) in the class structure 102 of any class thus identified. But no such determinations have yet been made at the beginning of an interval, and the collector resets all class structures' reachability fields in step 124 to reflect this fact.

As blocks 128 and 130 indicate, the collector then forms the collection set and begins processing remembered sets. Remember in this connection that a conventional remembered set records only the locations of intra-generation references to the associated car's objects so that those objects can be evacuated to the trains occupied by objects that refer to them. As was explained above, this type of evacuation tends to concentrate within respective trains the garbage cycles that consist of objects within the generation. But the present invention's purpose is additionally to concentrate within respective trains those objects that are in garbage cycles also containing certain types of extra-generation resources. In the illustrated embodiment the extra-generation resources of interest are those used to support object classes.

To this end, each car that contains a proxy object has a second, class remembered set associated with it as well as the conventional remembered set. Now, the illustrated embodiment uses each class's proxy object in the generation, in a manner that will be described below, as a proxy for that class's extra-generation resources. This means that, if any younger train contains an instance of a class whose proxy object has advanced to the collection set, that proxy object will need to be evacuated to one such younger train, even though that train will not in general have a reference to the proxy object. So, rather than representing, as a normal remembered-set entry does, the location of an object containing a reference into the associated car, each entry in a class remembered set represents the location of an object that is an instance of a class whose proxy object the associated car contains.

The illustrated embodiment updates class remembered sets on three kinds of occasions. The first kind occurs at the beginning of a collection interval (even before any younger generation is collected). The garbage collector identifies all objects directly allocated in the train-managed generation since the previous collection interval. It identifies each such object's class (by, in the illustrated embodiment, reading its nearClass field). If the generation contains the proxy object associated with that class, the collector may place into the class remembered set for the proxy object's car section an entry representing the newly allocated object's location.

That entry will differ from a normal-remembered-set entry. A normal remembered-set entry is the address of the reference into the car with which the remembered set is associated. The referring object's train can be inferred from the reference's address, and the reference's value is the referred-to object's location. But there is no such referring relationship between a given object and the proxy object representing the class of which the given object is an instance. So a class-remembered-set entry must contain two items of information rather than one. One item identifies the proxy object. In the illustrated embodiment, that item is a pointer to the class's nearClass object, although other embodiments may use some other way of identifying the proxy object.

The other item could identify the object whose recent allocation gave rise to the update; this would parallel the normal-remembered-set entry, which, too, identifies the object that gave rise to the entry. Some implementations of the present invention's teachings may take this approach. But we have taken a different approach.

Our approach arises from the following observation concerning the relationship between a class instance and its corresponding proxy object: unlike other references that an object may include, an object's reference to its class never changes. From this observation one can conclude that, if an instance of the class associated with a proxy object is located in a train younger than the one containing the proxy object, the proxy object will definitely be evacuated to a train at least that young when the proxy object reaches the collection set. So, whereas a normal remembered set must contain an entry for every younger-car object that has a reference to any object in the car associated with the remembered set, a class collection set's entries can be restricted to only a single, youngest-train instance of each class of which the associated car contains a proxy. Indeed, the entry need not even identify the class instance that gave rise to it; it need only identify its train.

This is the illustrated embodiment's approach. That is, after it has identified the class remembered set for the car containing the proxy object associated with the newly allocated object's class, the collector adds an entry to that remembered set if the remembered set previously had none for that class (because the generation previously had no instance of the class), or it changes an existing entry if necessary to identify the now-youngest train in which an instance resides.

The second type of occasion for class-remembered-set updating occurs if, as is typical, the incremental train-algorithm-based collection within a given collection interval is preceded during the same collection interval by collection of a younger generation. Objects may be "promoted" in that situation from the younger generation into the train-managed generation. When those objects are promoted, the same updating operation occurs for them.

The third type occurs during evacuation of objects from the collection set. When an object previously in the collection set is moved to another train, its class is identified, and the class remembered set of the car that contains that class's proxy object is updated as above if necessary.

Block 130's processing of the thus-updated remembered sets includes preparing the usual per-train scratch-pad lists described above. It also includes preparing a special, class-type scratch-pad list for each train that contains a proxy object or an instance of a class whose proxy object is in the train-algorithm-managed generation. Before we describe the class-type scratch-pad list, though, we will discuss the block-132 step's use of the usual scratch-pad lists in evacuating referred-to collection-set objects.

As block 132 indicates, the collector begins with the youngest train and evacuates into respective trains the collection-set objects to which their respective scratch-pad lists (both usual and class-type) direct it. In a normal scratch-pad list, each entry identifies a collection-set object. The collector removes that object to the train associated with the scratch-pad list, as is conventional. As is also conventional, it additionally removes to that train any other collection-set object to which the thus-removed object refers. It performs this process recursively: any collection-set object referred to by an object thus removed to a train is also removed to the same train.

As was explained above, this tends to concentrate into one train all the objects in a garbage cycle whose objects all reside in the train-managed generation. The resources occupied by those objects can therefore be reclaimed despite the collection process's incremental nature. But the present invention's purpose is also to reclaim the resources of objects in some cycles that additionally include certain extra-generational structures. In the illustrated embodiment, the structures of interest are those that are class-based.

So an object's removal to a train may trigger the removal to that train of collection-set objects in addition to those to which the removed object refers. Specifically, the collector also removes to that train those collection-set objects that are referred to by the extra-generational structures associated with classes determined by the removed objects. For all removed objects, this set of classes includes the ones of which the removed objects are instances. In addition, for a removed proxy object, this set of classes also includes the one for which the removed object is a proxy. Finally, this set includes all classes whose associated structures are reachable from the external structures associated with other classes in the set.

Figure 1:
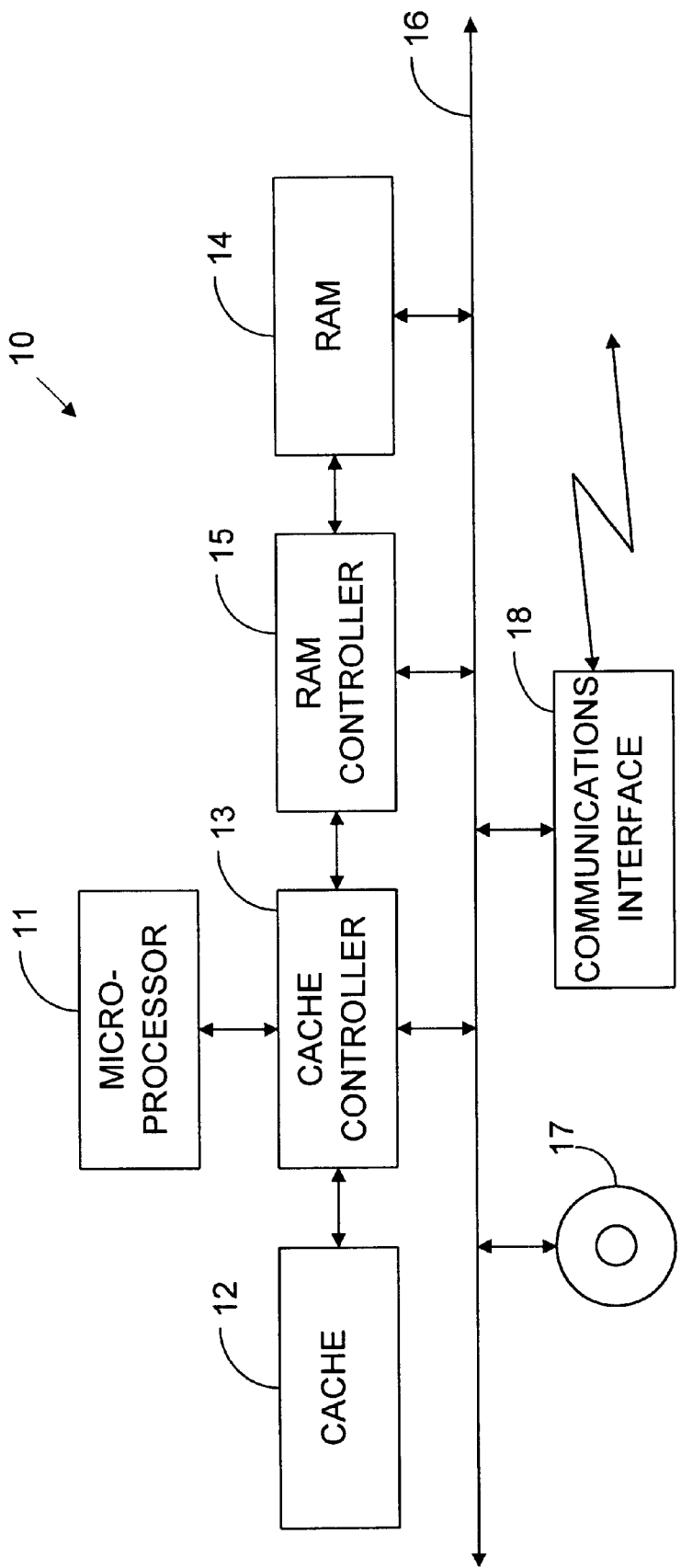
FIG. 1, discussed above, is a block diagram of a computer system in which the present invention's teachings can be practiced.
Figure 2:
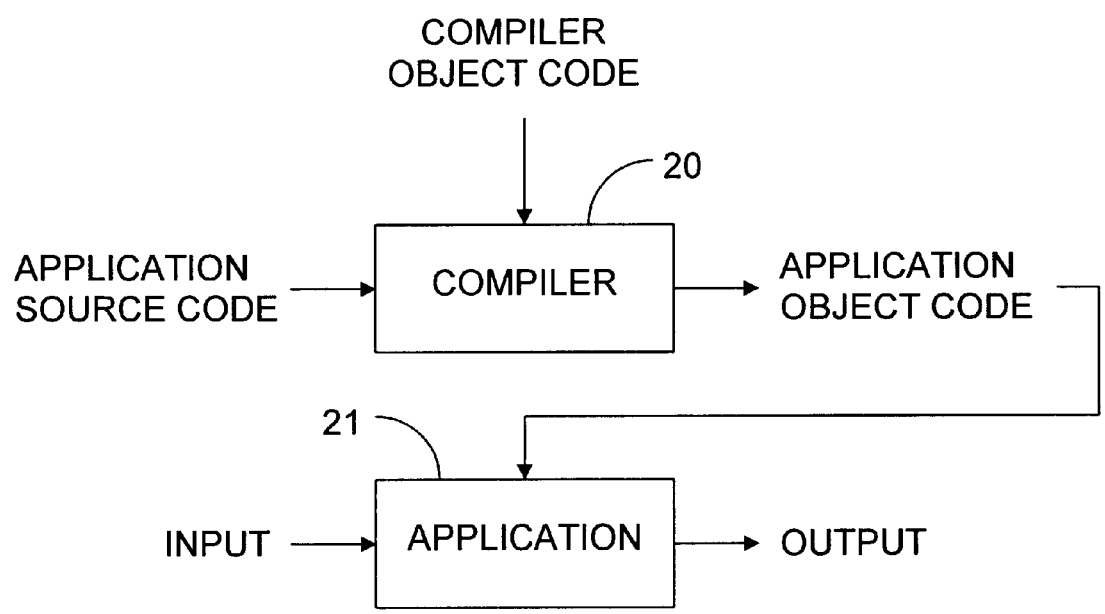
FIG. 2, discussed above, is a block diagram that illustrates a compiler's basic functions.
Figure 3:
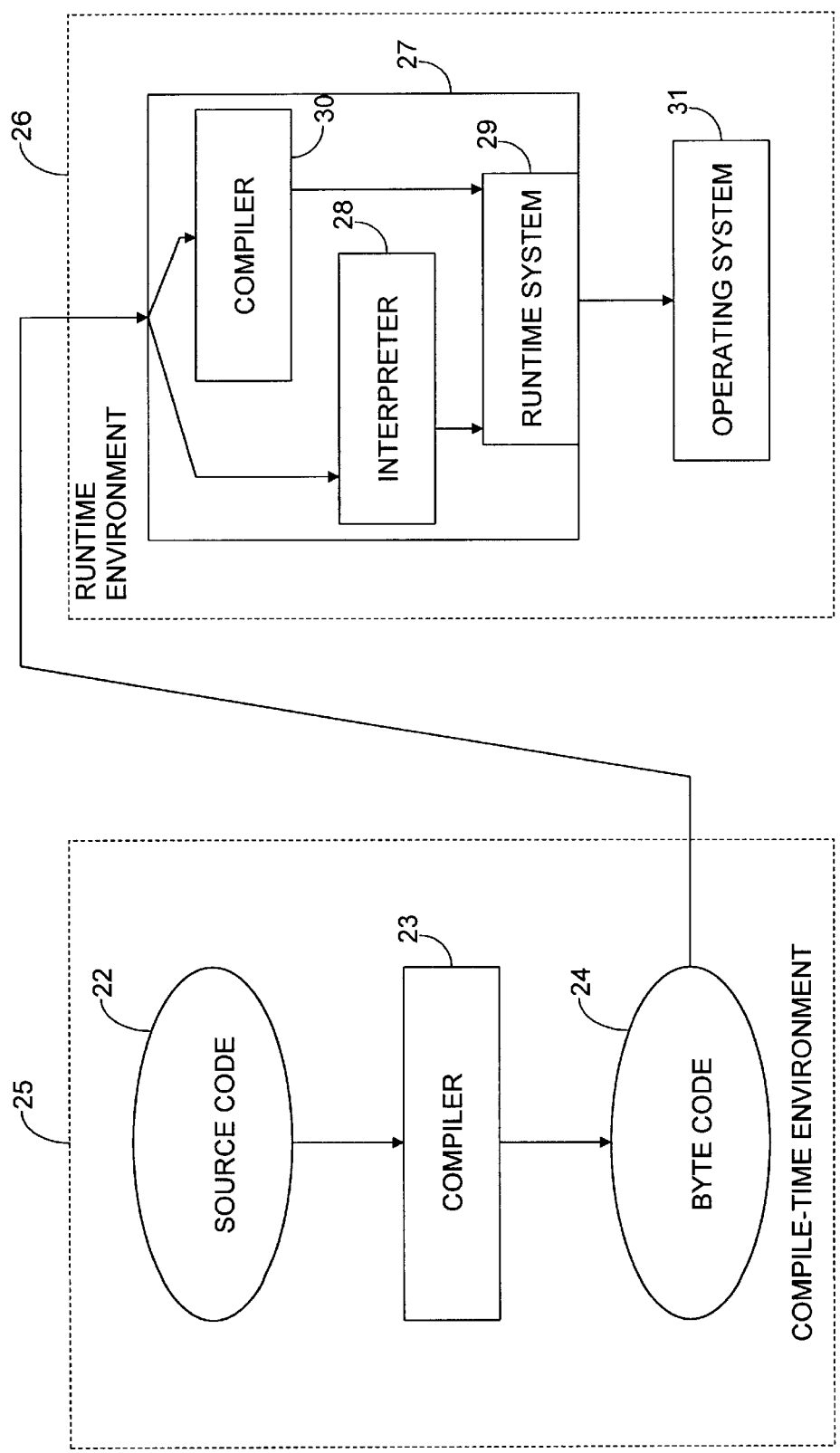
FIG. 3, discussed above, is a block diagram that illustrates a more-complicated compiler/interpreter organization.
Figure 4:
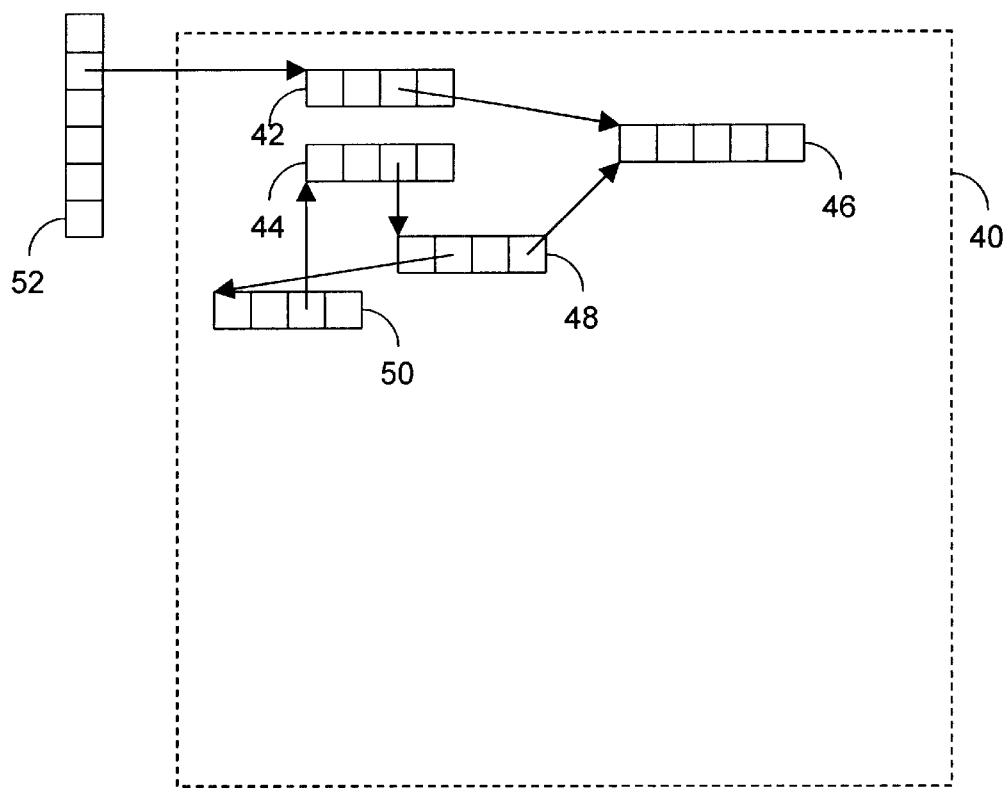
FIG. 4, discussed above, is a diagram that illustrates a basic garbage-collection mechanism.
Figure 5:
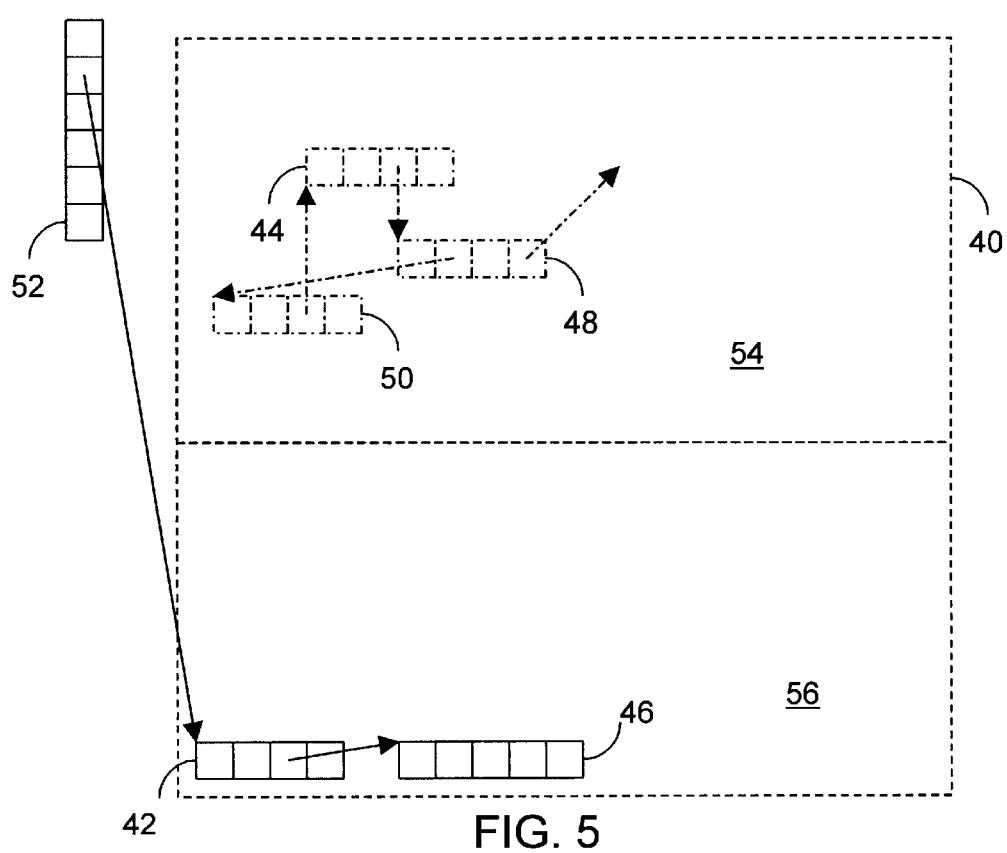
FIG. 5, discussed above, is a similar diagram illustrating that garbage-collection approach's relocation operation.
Figure 6:
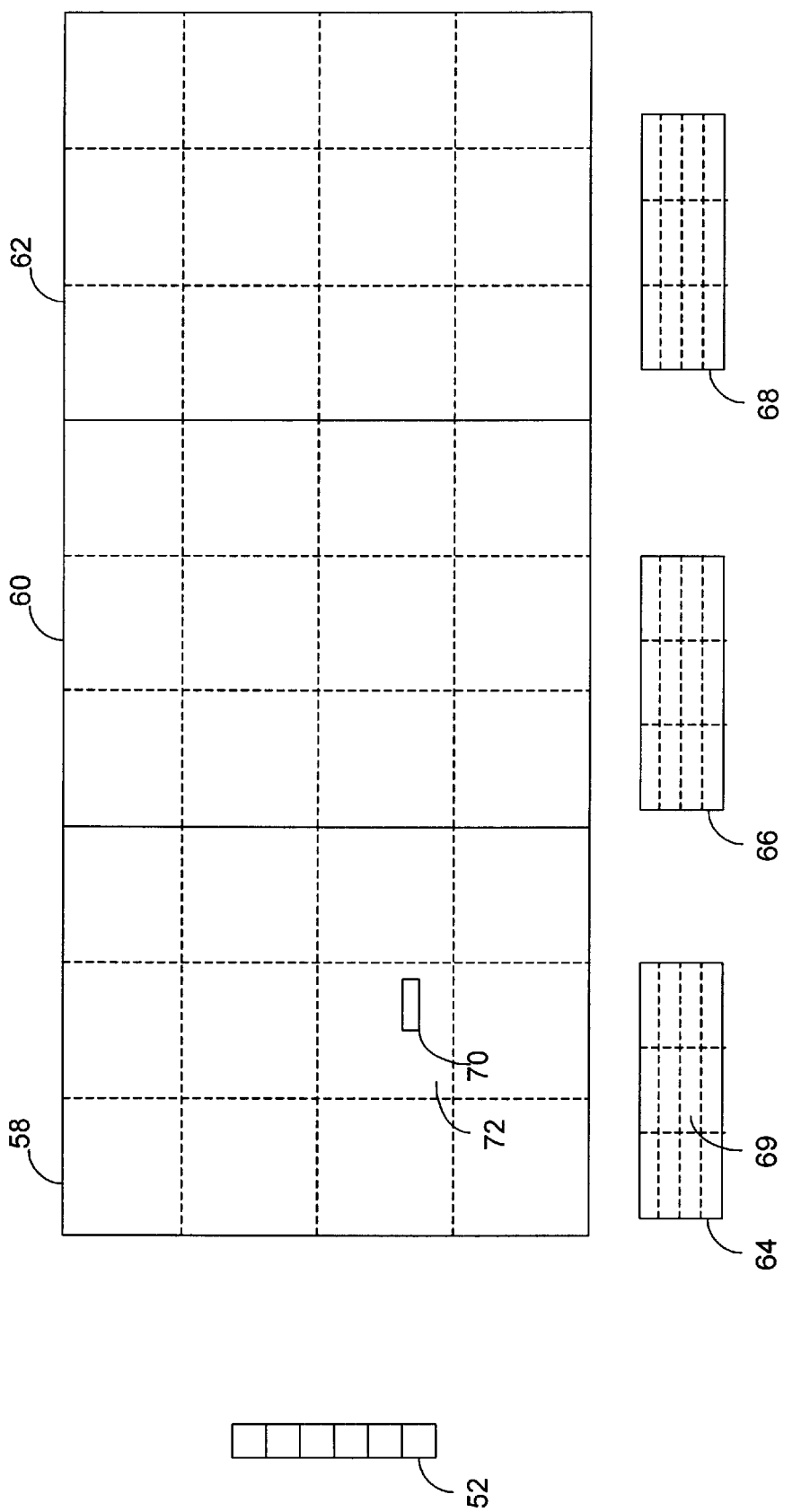
FIG. 6, discussed above, is a diagram that illustrates a garbage-collected heap's organization into generations.
Figure 7:
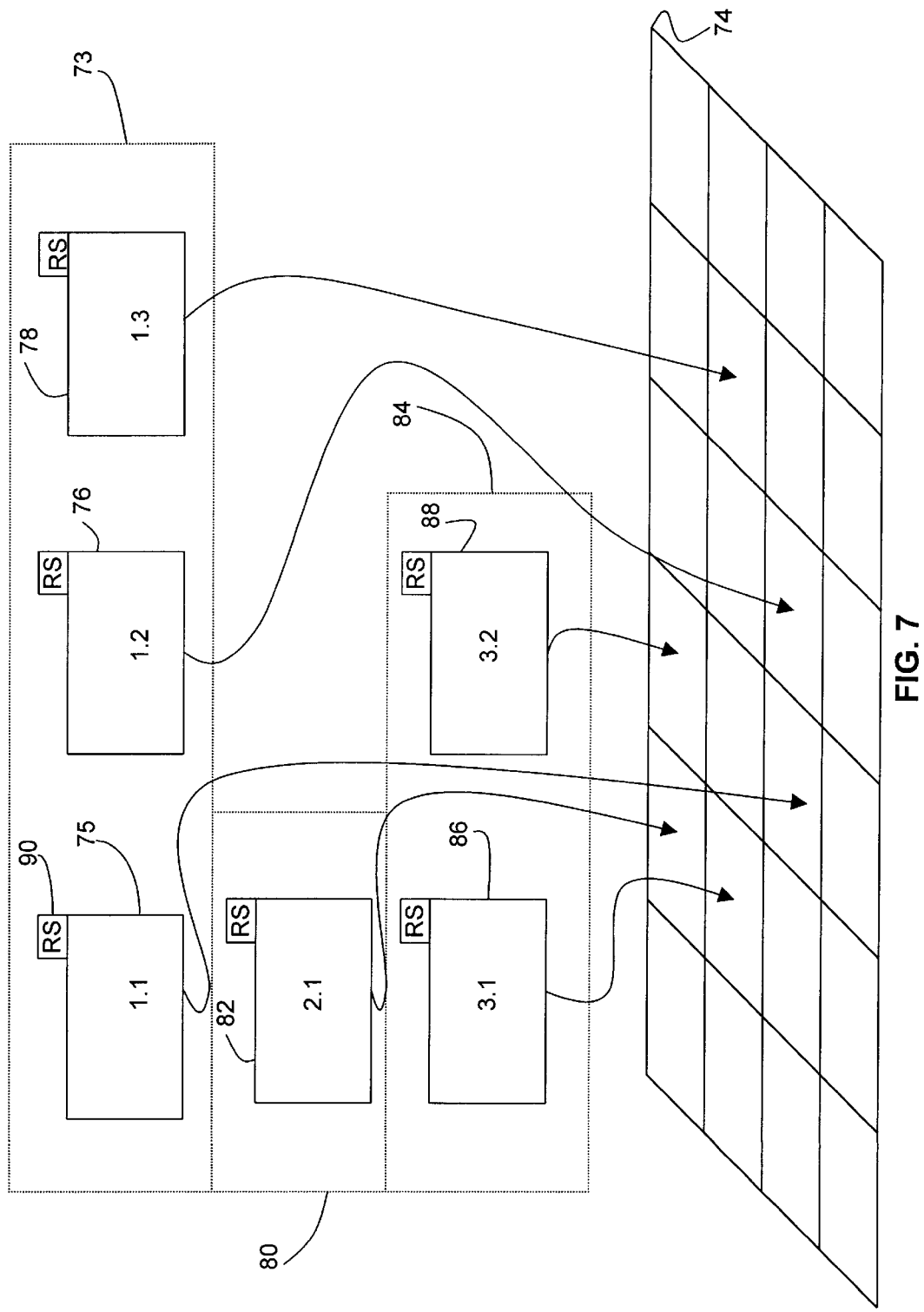
FIG. 7, discussed above, is a diagram that illustrates a generation organization employed for the train algorithm.
Figure 8A:
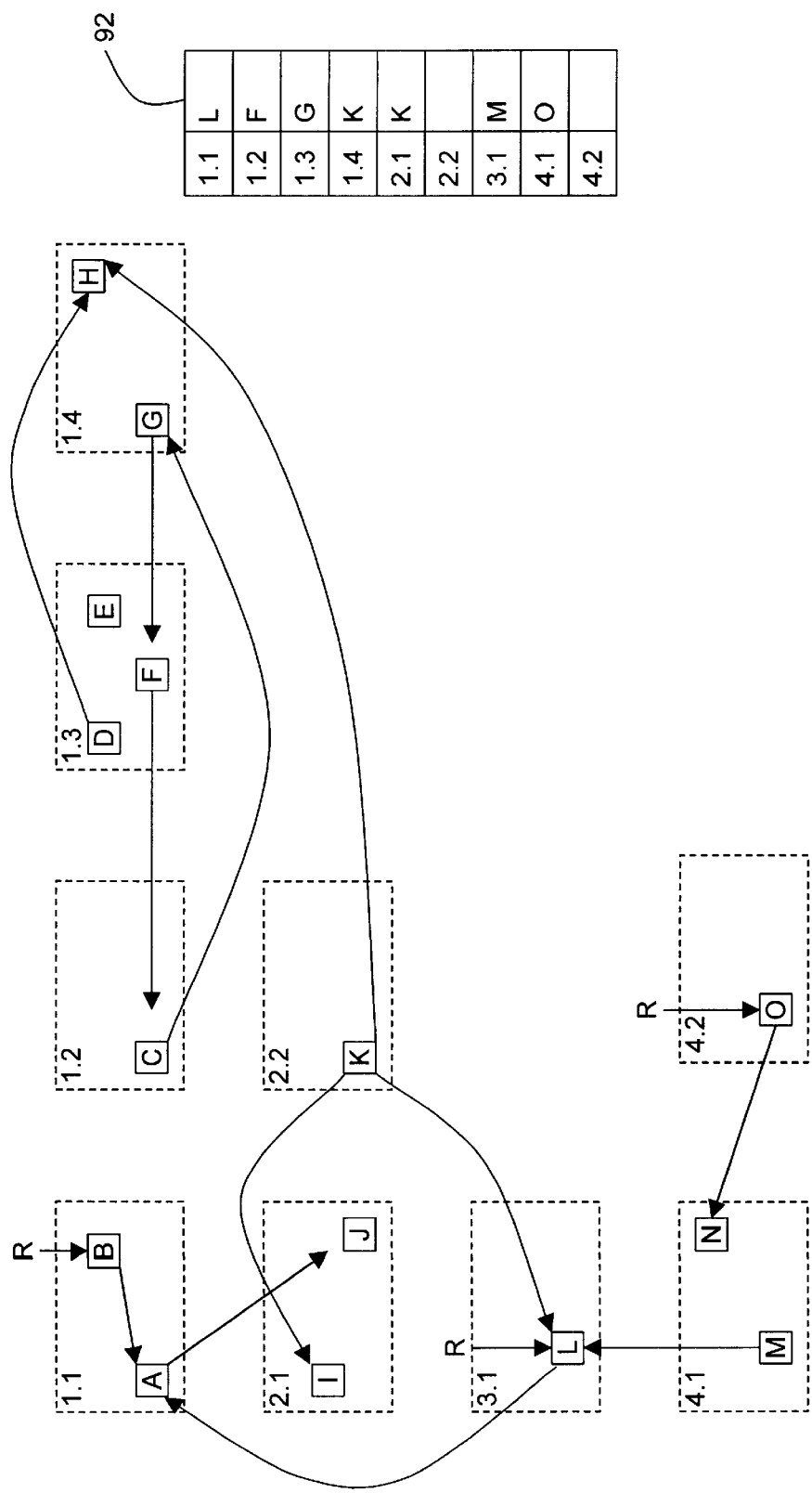
FIGS. 8A–J, discussed above, are diagrams illustrating a collection scenario that can result from use of the train algorithm.
Figure 8B:
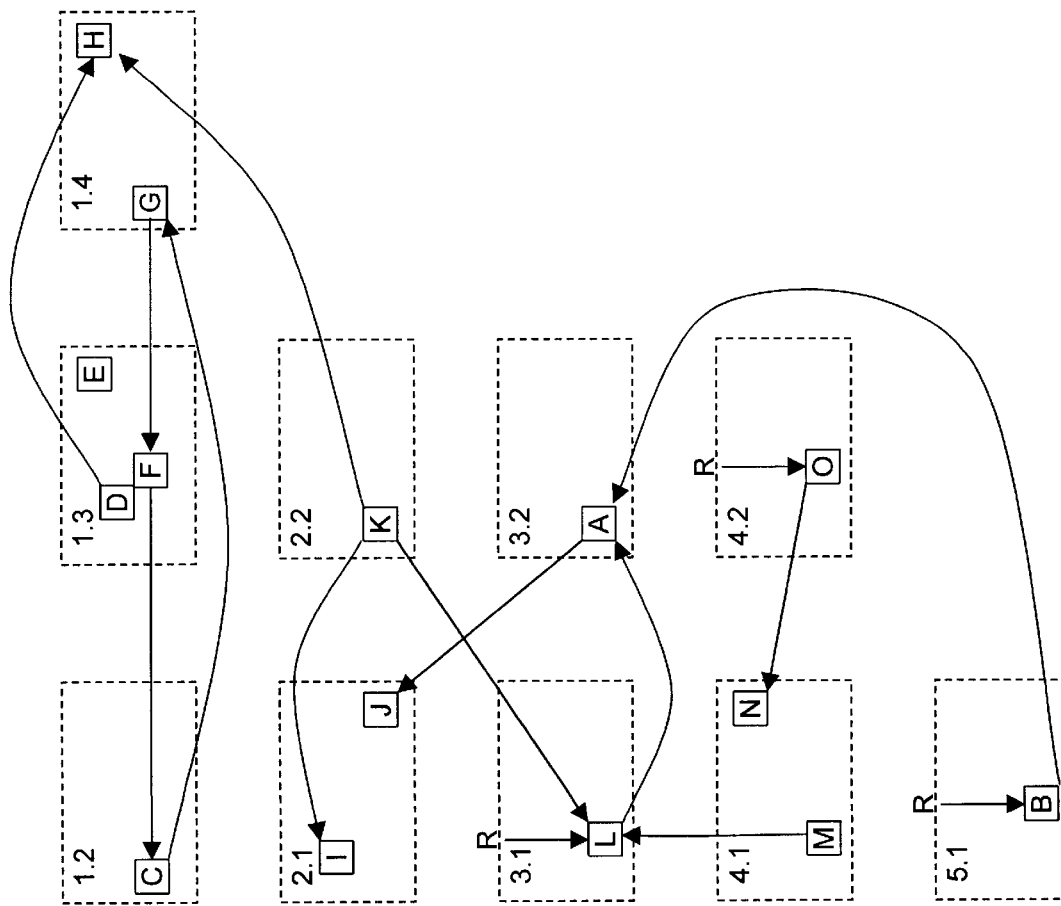
Figure 8C:
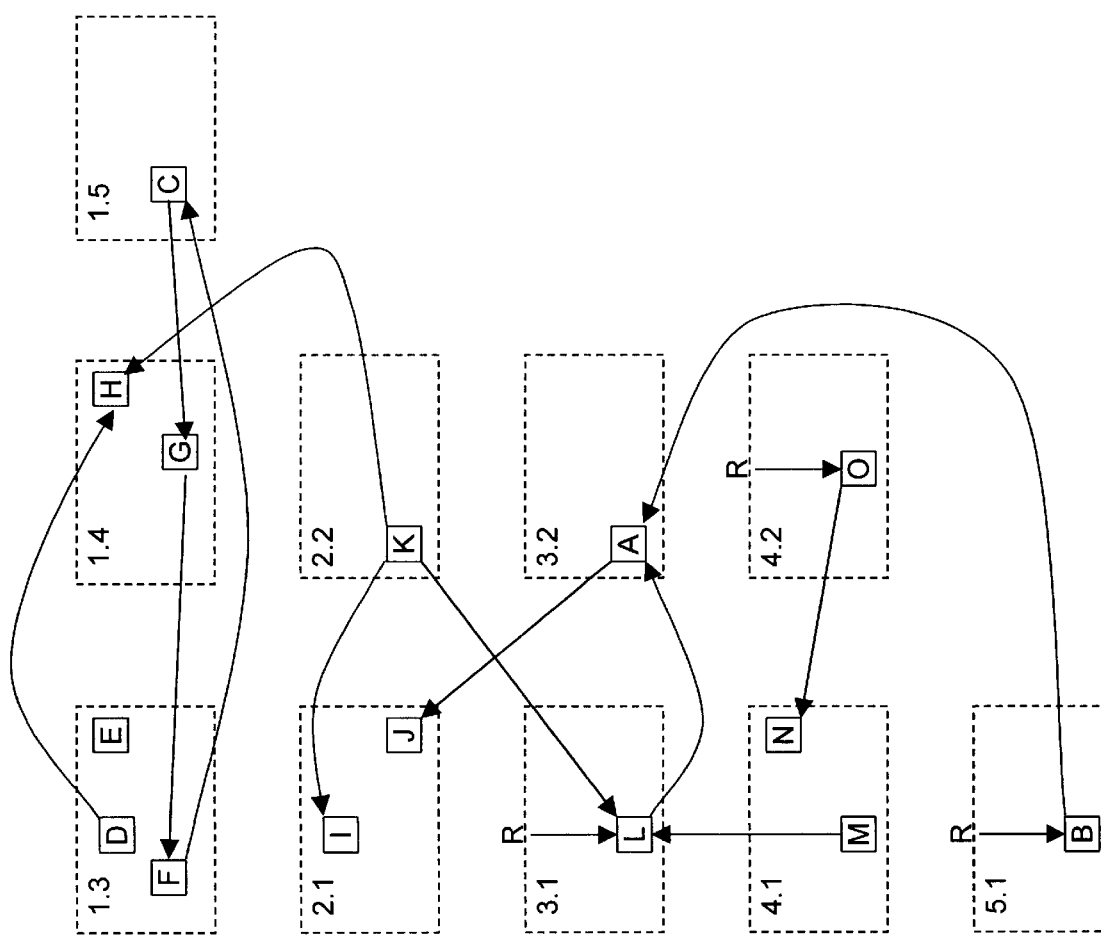
Figure 8D:
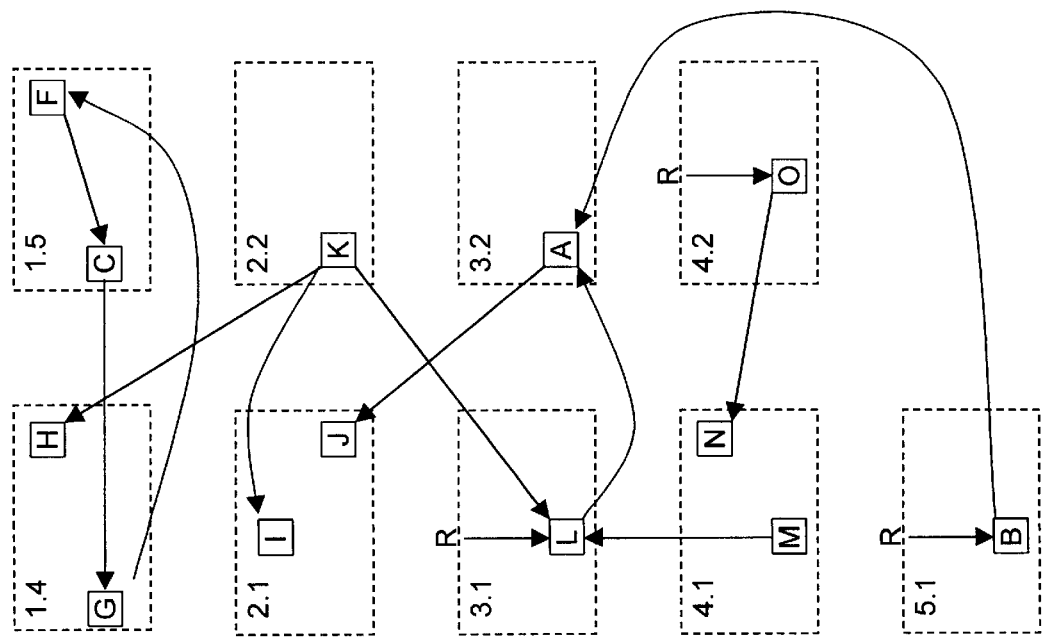
Figure 8E:
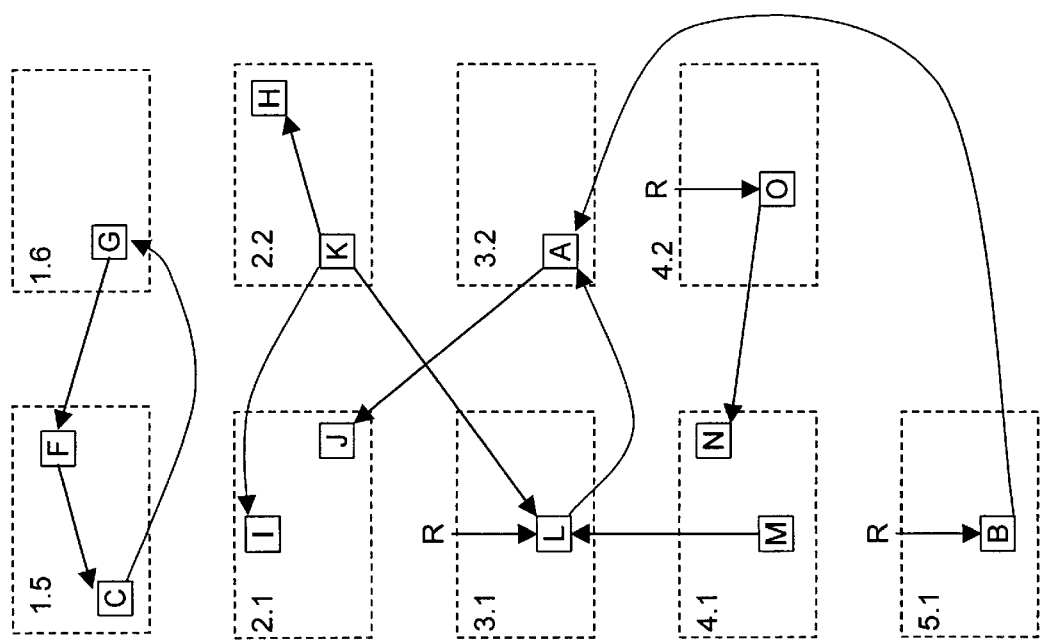
Figure 8F:
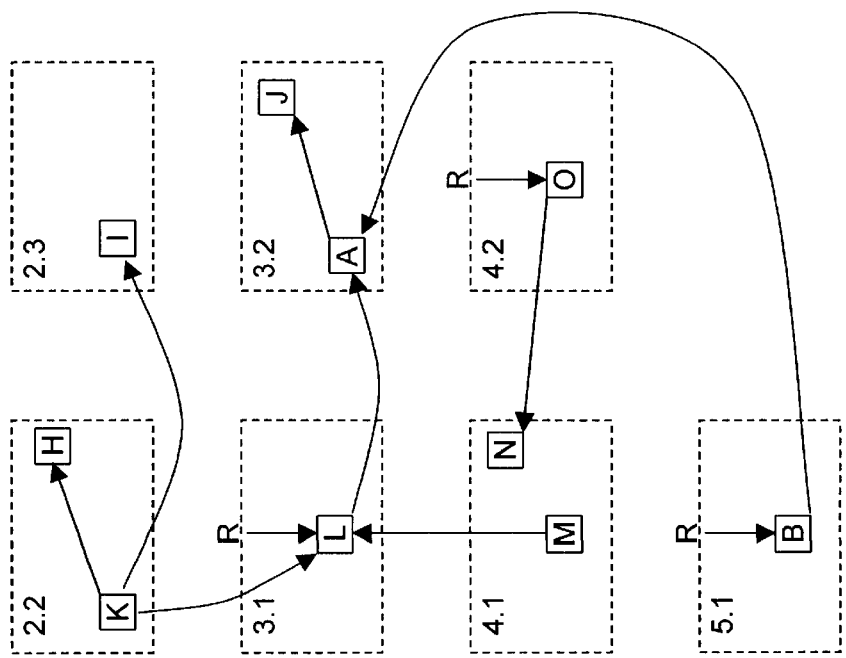
Figure 8G:
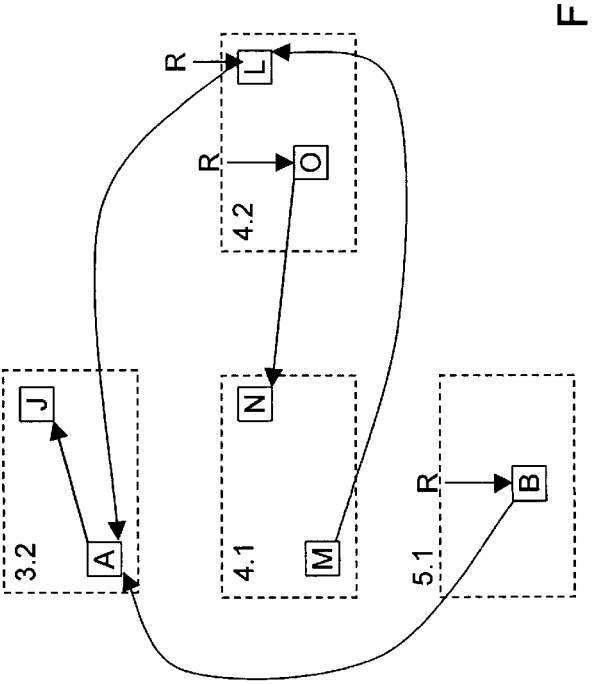
Figure 8H:
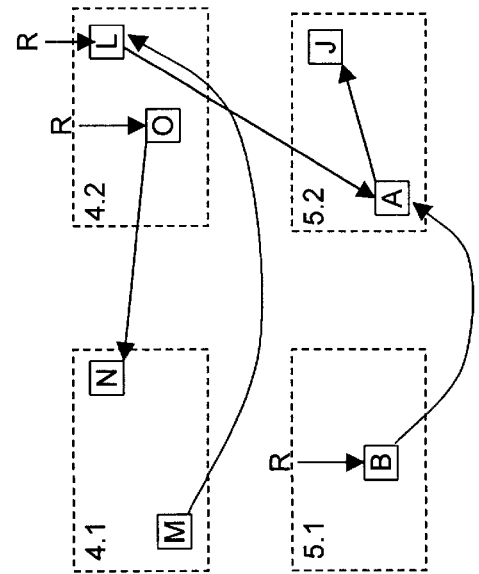
Figure 8I:
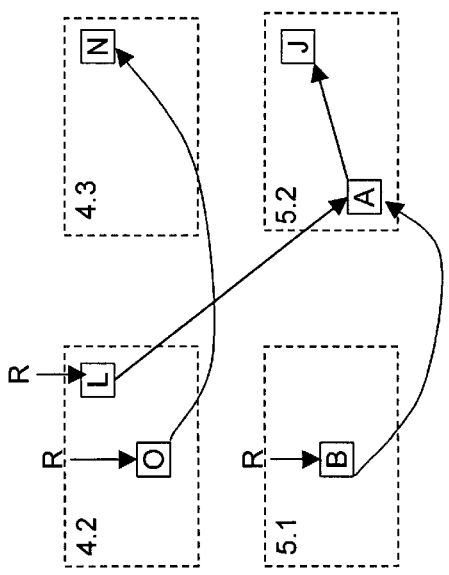
Figure 8J:
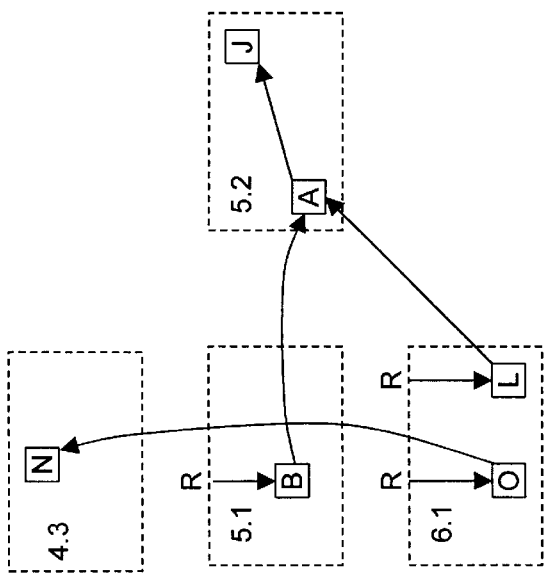
Figure 9A:
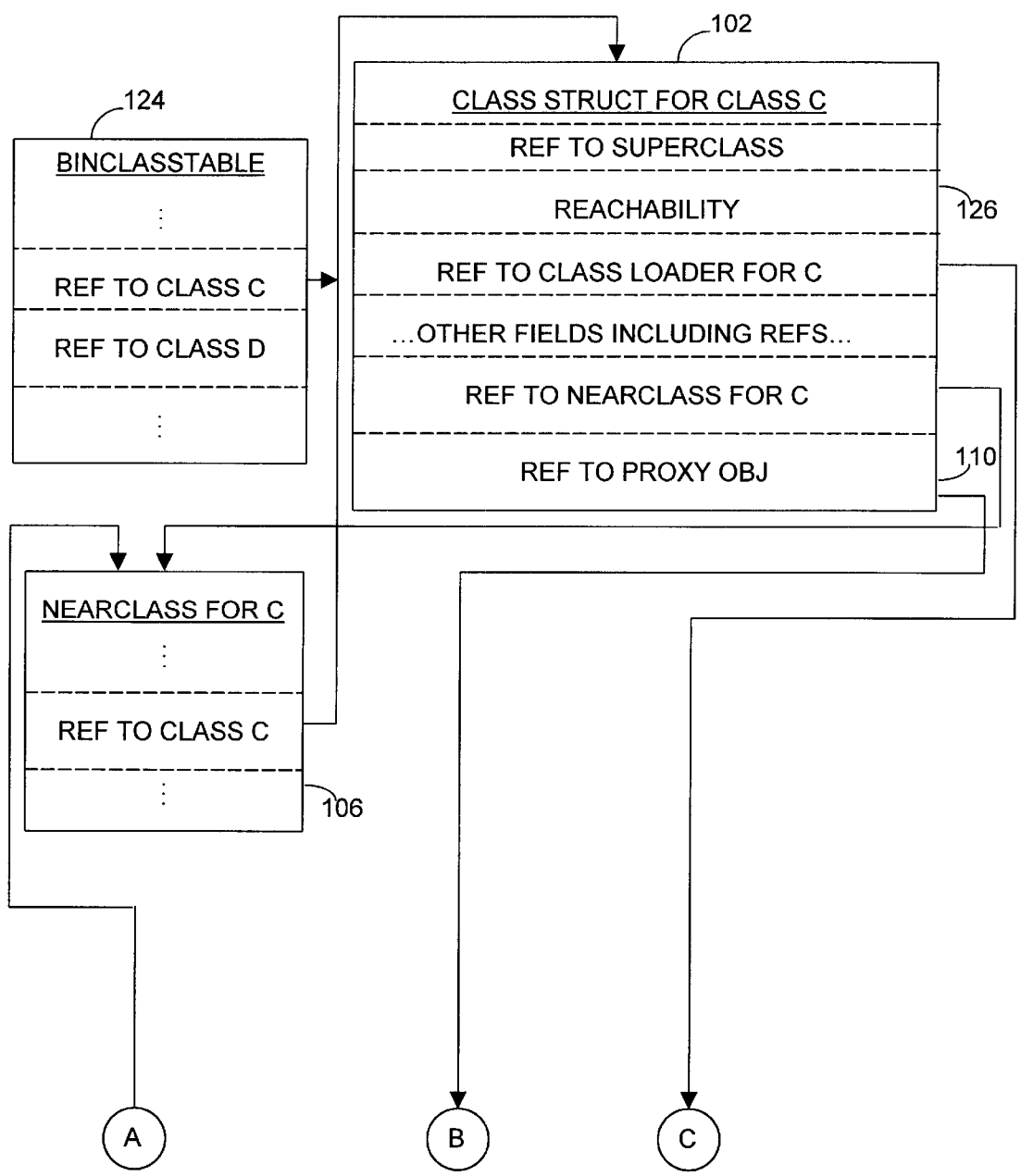
FIGS. 9A and 9B, discussed above, together form a diagram that illustrates the relationships among a class instance and the structures that support its class.
Figure 9B:
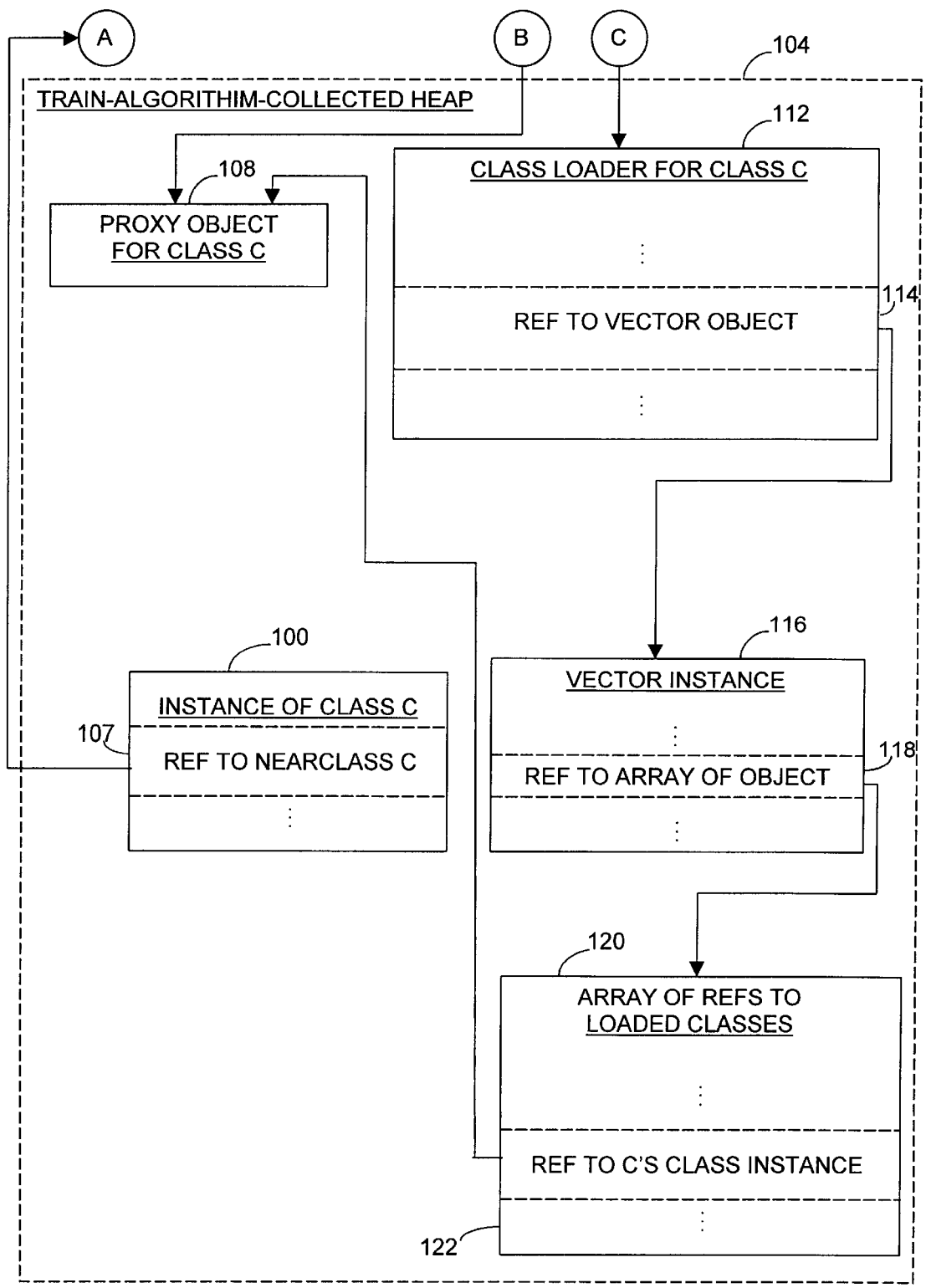

To this end, the illustrated embodiment considers not only the removed object's references to other collection-set objects but also its reference that identifies the class to which it belongs. As was mentioned above, this is a reference to a structure, such as the nearClass structure 106, that is outside the generation. If the external structures are as FIGS. 9A and 9B illustrate, the collector has to follow the thus-found structure 106's pointer to the associated class structure 102.

Now, the fact that the collector reached the class structure by following pointers from objects evacuated from the collection set means that the class structure is reachable from an object that will not be reclaimed during the current collection interval. A mark previously made in the class structure's reachability field 126 during the same collection interval may already indicate this fact. If so, the current scratch-pad-list entry's processing is complete.

Otherwise, the collector marks the reachability field 126 to indicate that the class structure 102 cannot be reclaimed, and it then identifies references from the class structure 102 into the collection set. For each such reference, the collector removes the referred-to object to the train associated with the source scratch-pad list. The collector also identifies references, such as reference 132, to other class structures, and it recursively processes them in a similar manner.

As was mentioned above, the collector performs the evacuation process by reference to special, class-type scratch-pad lists as well as to the usual scratch-pad lists whose use was just described. As was also mentioned above, the proxy objects serve in the illustrated embodiment as proxies for the resources that support the classes with which they are associated. This means that (in principle) the evacuation process should include evacuating to a train that contains a proxy object those collection-set objects that are referred to by references in extra-generational class structures associated with that proxy object.

Therefore, for at least each class of which the collection set contains an instance, creation of the class-type scratch-pad lists includes placing in each list the identity of the class whose proxy object the associated train contains. The collector also places in the scratch-pad list for the youngest train the identity of each class that has no proxy in the train-managed generation. For this purpose it may use a class-list structure 124, which an object-oriented program normally maintains to keep track of all its loaded classes. In the illustrated embodiment the list entry's identification of a class takes the form of a reference to the class's class structure, such as structure 102. In the evacuation process the collector follows that reference to the class structure and proceeds as was just described to evacuate the collection-set objects referred to by the references that it contains.

It was stated above that such collection-set objects are "in principle" evacuated to the trains containing the relevant proxy objects. In practice, though, some embodiments will actually employ an optimization that, when the time comes for the proxy object itself to be evacuated, reduces the number of other objects that have to be evacuated with it. In accordance with that optimization the collector in some cases actually evacuates such a collection-set object to a train that the relevant proxy object does not currently occupy but will eventually be evacuated to if an instance of the relevant class is not allocated beforehand in a still-younger train.

To this end, the collector's creation of the class-type scratch-pad list additionally includes stepping through each class whose proxy is in the generation, finding the youngest train containing an instance of that class, and placing that class's identity in that train's class scratch-pad list. This means that a collection-set object referred to from an extra-generational structure associated with a class of which an instance is located in a train younger than the train containing that class's proxy object will be evacuated to a train containing such an instance rather than to the train containing the proxy object.

Evacuation in accordance with the entries in the scratch-pad lists, both normal and class-type, proceeds from the youngest-train lists to those associated with successively older trains. But evacuation into the oldest train is actually unnecessary if there prove to be no references into the oldest train from outside of it; that train's car sections will all be reclaimed anyway. So some embodiments, such as the illustrated one, will interrupt the evacuation process before the last train in order to perform an operation that enables it to determine whether there are any references into the train from anywhere outside of it other than the collection set. (When they are selected for the collection set, its cars are conventionally thought of as no longer belonging to any train.)

Block 134 represents this operation, which involves searching the root set for references. If such a reference refers to a collection-set object, the collector removes the referred-to object into the youngest train. (Note that many externally referenced collection-set objects that would conventionally have been removed at this point will already have been removed to older trains, because the external references to them reside in external resources associated with classes whose proxy objects are in the train-managed generation.) As in the previous evacuations, the collector additionally removes to the youngest train not only any collection-set objects to which the thus-removed object refers but also any collection-set object to which the removed object's class structure refers.

If the referred-to object is not in the collection set but is in the train-managed generation, the collector marks that object's train as having an external reference into it. This will enable the collector subsequently to identify trains into which there are external references. Using this information together with a check of whether a train has references from other trains enables the collector to detect trains that contain only garbage and can therefore be reclaimed in toto. In some implementations, such as the current one, the external-reference mark is recorded in the object's car.

Now, when block 134's root-set search begins, any class structure has been marked if it is reachable from an object that is in the generation but outside the oldest train. Such structures should not be reclaimed. To identify any other reachable class structures, the collector marks any previously unmarked class structures associated with classes of which the root set refers to instances. It also marks all previously unmarked class structures associated with classes to which methods referred to in the call stacks' activation records belong. And it recursively scans any newly marked structure for references into the collection set.

As block 138 indicates, the illustrated embodiment then determines whether there are any non-collection-set references into the train either from within the generation or from outside it. If there are no such references, then all of the oldest train's objects are unreachable, so the collector reclaims all of its car sections, as block 138 indicates. In this situation, most collector implementations will additionally perform the same test on progressively younger trains until they find one into which references from outside of it do exist, and that train becomes the oldest remaining train. If the collector is a particularly aggressive implementation, it may further determine whether one or more of that oldest remaining train's oldest cars are devoid of references into it. If so, it reclaims that one or more cars' sections, too.

In those cases in which there are non-collection-set references into the train either from within the generation or from outside it, the collector processes the train's scratch-pad-list entries just as it did those of younger trains, and block 140 represents this operation.

A review of the class-structure-marking operations reveals that all of the following are true of any class structure that still remains unmarked after all the above-described operations: there are no references to it from outside the collection set, its proxy object is in the collection set, and its class loader is in the collection set. Since all objects to which there are any references from outside the collection set have already been evacuated from it, any unmarked class's proxy, any instances of it, and its class loader are all unreachable. This means that the class can be unloaded. In addition to reclaiming the proxy object, any object instances, and the class loader as part of the collection-set reclamation of block 142, this means that the collector sets the class-table entry for that class to, say, NULL, and reclaims its extra-heap structures, such as the illustrated embodiment's class and nearClass structures 102 and 106. Block 144 represents this step.

A review of the foregoing example will reveal that the present invention's teachings are not restricted to reclaiming memory that contains class-related structures. In any arrangement in which a garbage cycle can contain objects both within and outside the train-managed heap, objects within the heap can be used as proxies for the extra-heap objects and thus enable the collector to use the train algorithm to reclaim such cycles. As was explained above, this will in many instances enable the collector to reclaim objects whose reclamation would otherwise impose unacceptable delays. So the present invention constitutes a significant advance in the art

What is claimed is:

1. A method of garbage collection in which a train-algorithm-managed generation of a garbage-collected heap contains objects located in car sections and is collected in accordance with the train algorithm, in collection cycles for which respective collection sets of the car sections are established, by repeatedly establishing new trains, evacuating from the collection set the objects in the collection set that are referred to from outside the collection set, placing objects thus evacuated into trains containing objects that refer to them, and reclaiming the car sections that remain in the collection set, wherein the method further includes:
    A) associating proxy objects in the garbage-collected heap with respective external objects outside the garbage-collected heap; and
    B) evacuating from the collection set those of its objects that are referred to by external objects associated with proxy objects not in the collection set, the trains into which the objects thus evacuated are placed when the respective proxy objects are in the train-managed generation being the trains to which the respective proxy objects belong or to which the respective proxy objects are currently destined for evacuation.

2. A method as defined in claim 1 that further includes reclaiming the external objects with which are associated proxy objects that remain in the collection set after evacuation.

3. A method as defined in claim 1 wherein the external objects associated with the proxy objects represent object classes.

4. A method as defined in claim 3 that further includes reclaiming the external objects with which are associated proxy objects that remain in the collection set after evacuation.

5. A method as defined in claim 3 wherein the method includes evacuating from the collection set any proxy object with which is associated an external object that represents a class of which an instance exists outside the collection set.

6. A method as defined in claim 5 that further includes reclaiming the external objects with which are associated proxy objects that remain in the collection set after evacuation.

7. A method as defined in claim 5 wherein the method includes, when the collection set contains proxy objects with which are associated external objects that represent classes of which instances exist in trains within the garbage-collected generation, evacuating those proxy objects into the trains that contain those instances.

8. A method as defined in claim 7 that further includes reclaiming the external objects with which are associated proxy objects that remain in the collection set after evacuation.

9. A method as defined in claim 7 wherein the trains into which are evacuated proxy objects when the collection sets contain proxy objects with which are associated external objects that represent classes of which instances exist in trains within the garbage-collected generation are the youngest trains that contain those instances.

10. A method as defined in claim 9 that further includes reclaiming the external objects with which are associated proxy objects that remain in the collection set after evacuation.

11. A method as defined in claim 9 further comprising:
   A) maintaining for each class represented by an external structure associated with a proxy object in the train-algorithm-managed generation a youngest-train identifier of the youngest train containing an instance of that class; and
   B) evacuating proxy objects from the collection sets in accordance with youngest-train identifier maintained for the classes represented by the external structures with which those proxy objects are associated.

12. A method as defined in claim 11 wherein the method includes maintaining, for each car section that contains a proxy object associated with an external object that represents a class of which a younger train contains an instance, a remembered set containing the youngest-train identifier for each such class.

13. A method as defined in claim 12 that further includes reclaiming the external objects with which are associated proxy objects that remain in the collection set after evacuation.

14. A method as defined in claim 12 wherein:
   A) the method includes maintaining for each car section a regular remembered set containing entries corresponding to references into the car section from younger car sections; and
   B) objects are evacuated from car sections in accordance with the contents of those car sections' regular remembered sets.

15. A method as defined in claim 1 wherein:
   A) the external objects contain information on which objects in the train-managed generation depend; and
   B) the method further includes evacuating from the collection set those of its proxy objects that are associated with the external objects that contain information on which depend objects outside the collection set.

16. A method as defined in claim 15 that further includes reclaiming the external objects with which are associated proxy objects that remain in the collection set after evacuation.

17. A method as defined in claim 15 wherein the train into which is evacuated a proxy object from the collection set if that proxy object is associated with an external object containing information on which an object in a train within the garbage-collected generation depends is least as young as the youngest train that contains an object that depends on that external object.

18. A method as defined in claim 17 that further includes reclaiming the external objects with which are associated proxy objects that remain in the collection set after evacuation.

19. A garbage collector that employs the train algorithm to collect a train-algorithm-managed generation of a garbage-collected heap, which train-algorithm-managed generation contains objects located in car sections, the garbage collector collecting the train-algorithm-managed generation, in collection cycles for which respective collection sets of the car sections are established, by repeatedly establishing new trains, evacuating from the collection set the objects in the collection set that are referred to from outside the collection set, placing objects thus evacuated into trains containing objects that refer to them, and reclaiming the car sections that remain in the collection set, wherein the garbage collector:
   A) associates proxy objects in the garbage-collected heap with respective external objects outside the garbage-collected heap; and
   B) evacuates from the collection set those of its objects that are referred to by external objects associated with proxy objects not in the collection set, the trains into which the objects thus evacuated are placed when the respective proxy objects are in the train-managed generation being the trains to which the respective proxy objects belong or to which the respective proxy objects are currently destined for evacuation.

20. A garbage collector as defined in claim 19 that additionally reclaims the external objects with which are associated proxy objects that remain in the collection set after evacuation.

21. A garbage collector as defined in claim 19 wherein the external objects associated with the proxy objects represent object classes.

22. A garbage collector as defined in claim 21 that additionally reclaims the external objects with which are associated proxy objects that remain in the collection set after evacuation.

23. A garbage collector as defined in claim 21 that additionally evacuates from the collection set any proxy object with which is associated an external object that represents a class of which an instance exists outside the collection set.

24. A garbage collector as defined in claim 23 that additionally reclaims the external objects with which are associated proxy objects that remain in the collection set after evacuation.

25. A garbage collector as defined in claim 23 that, when the collection set contains proxy objects with which are associated external objects that represent classes of which instances exist in trains within the garbage-collected generation, evacuates those proxy objects into the trains that contain those instances.

26. A garbage collector as defined in claim 25 that additionally reclaims the external objects with which are associated proxy objects that remain in the collection set after evacuation.

27. A garbage collector as defined in claim 25 wherein the trains into which are evacuated proxy objects when the collection sets contain proxy objects with which are associated external objects that represent classes of which instances exist in trains within the garbage-collected generation are the youngest trains that contain those instances.

28. A garbage collector as defined in claim 27 that additionally reclaims the external objects with which are associated proxy objects that remain in the collection set after evacuation.

29. A garbage collector as defined in claim 27 that additionally:
   A) maintains for each class represented by an external structure associated with a proxy object in the train-algorithm-managed generation a youngest-train identifier of the youngest train containing an instance of that class; and
   B) evacuates proxy objects from the collection sets in accordance with youngest-train identifier maintained for the classes represented by the external structures with which those proxy objects are associated.

30. A garbage collector as defined in claim 29 wherein the garbage collector maintains, for each car section that contains a proxy object associated with an external object that represents a class of which a younger train contains an instance, a remembered set containing the youngest-train identifier for each such class.

31. A garbage collector as defined in claim 30 that additionally reclaims the external objects with which are associated proxy objects that remain in the collection set after evacuation.

32. A garbage collector as defined in claim 30 wherein:
A) the garbage collector maintains for each car section a regular remembered set containing entries corresponding to references into the car section from younger car sections; and
B) objects are evacuated from car sections in accordance with the contents of those car sections' regular remembered sets.

33. A garbage collector as defined in claim 19 wherein:
A) the external objects contain information on which objects in the train-managed generation depend; and
B) the garbage collector additionally evacuates from the collection set those of its proxy objects that are associated with the external objects that contain information on which depend objects outside the collection set.

34. A garbage collector as defined in claim 33 that additionally reclaims the external objects with which are associated proxy objects that remain in the collection set after evacuation.

35. A garbage collector as defined in claim 33 wherein the train into which is evacuated a proxy object from the collection set if that proxy object is associated with an external object containing information on which an object in a train within the garbage-collected generation depends is least as young as the youngest train that contains an object that depends on that external object.

36. A garbage collector as defined in claim 35 that additionally reclaims the external objects with which are associated proxy objects that remain in the collection set after evacuation.

37. A storage medium containing instructions readable by a computer configure the computer to operate as a garbage collector that employs the train algorithm to collect a train-algorithm-managed generation of a garbage-collected heap, which train-algorithm-managed generation contains objects located in car sections, the garbage collector collecting the train-algorithm-managed generation, in collection cycles for which respective collection sets of the car sections are established, by repeatedly establishing new trains, evacuating from the collection set the objects in the collection set referred to from outside the collection set, placing objects thus evacuated into trains containing objects that refer to them, and reclaiming the car sections that remain in the collection set, wherein the garbage collector:
A) associates proxy objects in the garbage-collected heap with respective external objects outside the garbage-collected heap; and
B) evacuates from the collection set those of its objects that are referred to by external objects associated with proxy objects not in the collection set, the trains into which the objects thus evacuated are placed when the respective proxy objects are in the train-managed generation being the trains to which the respective proxy objects belong or to which the respective proxy objects are currently destined for evacuation.

38. A storage medium as defined in claim 37 wherein the garbage collector additionally reclaims the external objects with which are associated proxy objects that remain in the collection set after evacuation.

39. A storage medium as defined in claim 37 wherein the external objects associated with the proxy objects represent object classes.

40. A storage medium as defined in claim 39 wherein the garbage collector additionally reclaims the external objects with which are associated proxy objects that remain in the collection set after evacuation.

41. A storage medium as defined in claim 39 wherein the garbage collector additionally evacuates from the collection set any proxy object with which is associated an external object that represents a class of which an instance exists outside the collection set.

42. A storage medium as defined in claim 41 wherein the garbage collector additionally reclaims the external objects with which are associated proxy objects that remain in the collection set after evacuation.

43. A storage medium as defined in claim 41 wherein the garbage collector, when the collection set contains proxy objects with which are associated external objects that represent classes of which instances exist in trains within the garbage-collected generation, evacuates those proxy objects into the trains that contain those instances.

44. A storage medium as defined in claim 43 wherein the garbage collector additionally reclaims the external objects with which are associated proxy objects that remain in the collection set after evacuation.

45. A storage medium as defined in claim 43 wherein the trains into which are evacuated proxy objects when the collection sets contain proxy objects with which are associated external objects that represent classes of which instances exist in trains within the garbage-collected generation are the youngest trains that contain those instances.

46. A storage medium as defined in claim 45 wherein the garbage collector additionally reclaims the external objects with which are associated proxy objects that remain in the collection set after evacuation.

47. A storage medium as defined in claim 45 wherein the garbage collector additionally:
A) maintains for each class represented by an external structure associated with a proxy object in the train-algorithm-managed generation a youngest-train identifier of the youngest train containing an instance of that class; and
B) evacuates proxy objects from the collection sets in accordance with youngest-train identifier maintained for the classes represented by the external structures with which those proxy objects are associated.

48. A storage medium as defined in claim 47 wherein the garbage collector maintains, for each car section that contains a proxy object associated with an external object that represents a class of which a younger train contains an instance, a remembered set containing the youngest-train identifier for each such class.

49. A storage medium as defined in claim 48 wherein the garbage collector additionally reclaims the external objects with which are associated proxy objects that remain in the collection set after evacuation.

50. A storage medium as defined in claim 48 wherein:
A) the garbage collector maintains for each car section a regular remembered set containing entries corresponding to references into the car section from younger car sections; and
B) objects are evacuated from car sections in accordance with the contents of those car sections' regular remembered sets.

51. A storage medium as defined in claim 37 wherein:
A) the external objects contain information on which objects in the train-managed generation depend; and B) the garbage collector additionally evacuates from the collection set those of its proxy objects that are associated with the external objects that contain information on which depend objects outside the collection set.

52. A storage medium as defined in claim 51 wherein the garbage collector additionally reclaims the external objects with which are associated proxy objects that remain in the collection set after evacuation.

53. A storage medium as defined in claim 51 wherein the train into which is evacuated a proxy object from the collection set if that proxy object is associated with an external object containing information on which an object in a train within the garbage-collected generation depends is least as young as the youngest train that contains an object that depends on that external object.

54. A storage medium as defined in claim 53 wherein the garbage collector additionally reclaims the external objects with which are associated proxy objects that remain in the collection set after evacuation.

55. A computer signal representing sequences of instructions that, when executed by a processor, cause it to operate as a garbage collector that employs the train algorithm to collect a train-algorithm-managed generation of a garbage-collected heap, which train-algorithm-managed generation contains objects located in car sections, the garbage collector collecting the train-algorithm-managed generation, in collection cycles for which respective collection sets of the car sections are established, by repeatedly establishing new trains, evacuating from the collection set the objects in the collection set referred to from outside the collection set, placing objects thus evacuated into the youngest trains containing objects that refer to them, and reclaiming the car sections that remain in the collection set, wherein the garbage collector:
    A) associates proxy objects in the garbage-collected heap with respective external objects outside the garbage-collected heap; and
    B) evacuates from the collection set those of its objects that are referred to by external objects associated with proxy objects not in the collection set, the trains into which the objects thus evacuated are placed when the respective proxy objects are in the train-managed generation being the trains to which the respective proxy objects belong or to which the respective proxy objects are currently destined for evacuation.

56. A computer signal as defined in claim 55 wherein the garbage collector additionally reclaims the external objects with which are associated proxy objects that remain in the collection set after evacuation.

57. A computer signal as defined in claim 55 wherein the external objects associated with the proxy objects represent object classes.

58. A computer signal as defined in claim 57 wherein the garbage collector additionally reclaims the external objects with which are associated proxy objects that remain in the collection set after evacuation.

59. A computer signal as defined in claim 57 wherein the garbage collector additionally evacuates from the collection set any proxy object with which is associated an external object that represents a class of which an instance exists outside the collection set.

60. A computer signal as defined in claim 59 wherein the garbage collector additionally reclaims the external objects with which are associated proxy objects that remain in the collection set after evacuation.

61. A computer signal as defined in claim 59 wherein the garbage collector, when the collection set contains proxy objects with which are associated external objects that represent classes of which instances exist in trains within the garbage-collected generation, evacuates those proxy objects into the trains that contain those instances.

62. A computer signal as defined in claim 61 wherein the garbage collector additionally reclaims the external objects with which are associated proxy objects that remain in the collection set after evacuation.

63. A computer signal as defined in claim 61 wherein the trains into which are evacuated proxy objects when the collection sets contain proxy objects with which are associated external objects that represent classes of which instances exist in trains within the garbage-collected generation are the youngest trains that contain those instances.

64. A computer signal as defined in claim 63 wherein the garbage collector additionally reclaims the external objects with which are associated proxy objects that remain in the collection set after evacuation.

65. A computer signal as defined in claim 63 wherein the garbage collector additionally:
    A) maintains for each class represented by an external structure associated with a proxy object in the train-algorithm-managed generation a youngest-train identifier of the youngest train containing an instance of that class; and
    B) evacuates proxy objects from the collection sets in accordance with youngest-train identifier maintained for the classes represented by the external structures with which those proxy objects are associated.

66. A computer signal as defined in claim 65 wherein the garbage collector maintains, for each car section that contains a proxy object associated with an external object that represents a class of which a younger train contains an instance, a remembered set containing the youngest-train identifier for each such class.

67. A computer signal as defined in claim 66 wherein the garbage collector additionally reclaims the external objects with which are associated proxy objects that remain in the collection set after evacuation.

68. A computer signal as defined in claim 66 wherein:
    A) the garbage collector maintains for each car section a regular remembered set containing entries corresponding to references into the car section from younger car sections; and
    B) objects are evacuated from car sections in accordance with the contents of those car sections' regular remembered sets.

69. A computer signal as defined in claim 55 wherein:
    A) the external objects contain information on which objects in the train-managed generation depend; and
    B) the garbage collector additionally evacuates from the collection set those of its proxy objects that are associated with the external objects that contain information on which depend objects outside the collection set.

70. A computer signal as defined in claim 69 wherein the garbage collector additionally reclaims the external objects with which are associated proxy objects that remain in the collection set after evacuation.

71. A computer signal as defined in claim 69 wherein the train into which is evacuated a proxy object from the collection set if that proxy object is associated with an external object containing information on which an object in a train within the garbage-collected generation depends is least as young as the youngest train that contains an object that depends on that external object.

72. A computer signal as defined in claim 71 wherein the garbage collector additionally reclaims the external objects with which are associated proxy objects that remain in the collection set after evacuation.

73. A garbage collector that employs the train algorithm to collect a train-algorithm-managed generation of a garbage-collected heap, which train-algorithm-managed generation contains objects located in car sections, the garbage collector collecting the train-algorithm-managed generation, in collection cycles for which respective collection sets of the car sections are established, by repeatedly establishing new trains, evacuating from the collection set the objects in the collection set referred to from outside the collection set, placing objects thus evacuated into trains containing objects that refer to them, and reclaiming the car sections that remain in the collection set, wherein the garbage collector includes:
- A) means for associating proxy objects in the garbage-collected heap with respective external objects outside the garbage-collected heap; and
- B) means for evacuating from the collection set those of its objects that are referred to by external objects associated with proxy objects not in the collection set, the trains into which the objects thus evacuated are placed when the respective proxy objects are in the train-managed generation being the trains to which the respective proxy objects belong or to which the respective proxy objects are currently destined for evacuation.

* * * * *